US012663899B2

(12) United States Patent
Man et al.

(10) Patent No.: US 12,663,899 B2
(45) Date of Patent: Jun. 23, 2026

(54) TOUCHSCREEN DEVICE AND METHOD OF OPERATING THE SAME

(71) Applicant: STMicroelectronics International N.V., Geneva (CH)

(72) Inventors: Da Man, Beijing (CN); Bin Fan, Beijing (CN); Yue Ding, Beijing (CN); Pengcheng Wen, Beijing (CN)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/808,497

(22) Filed: Aug. 19, 2024

(65) Prior Publication Data

US 2026/0050346 A1 Feb. 19, 2026

(51) Int. Cl.
*G06F 3/041* (2006.01)
*G06F 3/044* (2006.01)

(52) U.S. Cl.
CPC .......... *G06F 3/04186* (2019.05); *G06F 3/044* (2013.01)

(58) Field of Classification Search
CPC ....................................................... G06F 3/044
USPC ................................................. 345/173–174
See application file for complete search history.

(56) References Cited

U.S. PATENT DOCUMENTS

| | | | | | |
|---|---|---|---|---|---|
| 8,542,210 | B2 * | 9/2013 | Westerman | ......... | G06F 3/04182 |
| | | | | | 345/173 |
| 8,982,097 | B1 * | 3/2015 | Kuzo | ................. | G06F 3/04186 |
| | | | | | 345/174 |

| | | | | |
|---|---|---|---|---|
| 9,442,609 | B2 | 9/2016 | Yu et al. | |
| 9,703,421 | B2 | 7/2017 | Bai et al. | |
| 9,733,767 | B2 | 8/2017 | Shin et al. | |
| 10,209,828 | B2 | 2/2019 | Kang et al. | |
| 10,365,764 | B2 | 7/2019 | Korapati et al. | |
| 10,437,384 | B2 | 10/2019 | Oral et al. | |
| 10,712,867 | B2 | 7/2020 | Li et al. | |
| 2015/0242051 | A1 | 8/2015 | Ng et al. | |
| 2017/0269729 | A1 * | 9/2017 | Chintalapoodi | ..... G01N 27/223 |
| 2018/0011596 | A1 | 1/2018 | Korapati et al. | |
| 2018/0149548 | A1 | 5/2018 | Zhang | |
| 2018/0307375 | A1 * | 10/2018 | Shah | ................... G06F 3/04186 |
| 2019/0163323 | A1 * | 5/2019 | Heim | ................. G06F 3/04186 |
| 2019/0346969 | A1 * | 11/2019 | Yip | ....................... G06F 3/0436 |
| 2022/0404932 | A1 * | 12/2022 | Gray | .................... G06F 3/0418 |

* cited by examiner

*Primary Examiner* — Kwin Xie

(74) *Attorney, Agent, or Firm* — Slater Matsil, LLP

(57) ABSTRACT

A method of operating a touchscreen device includes measuring a raw data value at a touch node among a plurality of touch nodes on the touchscreen device, assigning a positive touch value to each touch node having a positive raw data value greater than a first predetermined threshold, assigning a negative touch value to each touch node having a negative raw data value less than a second predetermined threshold, determining a total count of the positive touch values and negative touch values, determining a differ count for each of the touch nodes, the differ count being a number of touch nodes containing the negative touch values surrounding each touch node, calculating a percentage based on a ratio of a sum of the differ count and the total count, and entering a pre-water mode when the percentage exceeds a threshold percentage.

21 Claims, 20 Drawing Sheets

100

102

150

42%

500b

68%

500d

122%

144%

600c

700

900

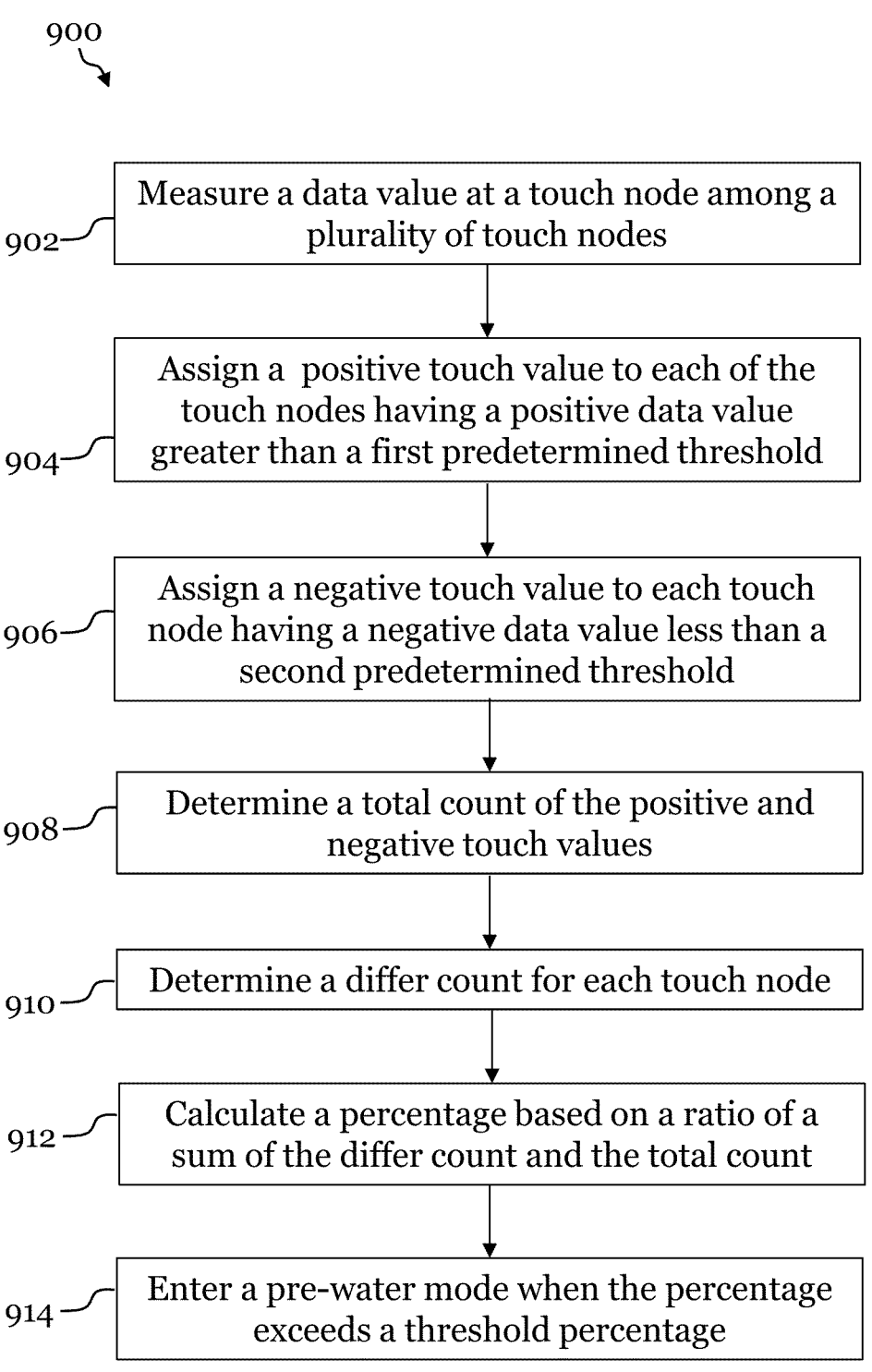

902 — Measure a data value at a touch node among a plurality of touch nodes

904 — Assign a positive touch value to each of the touch nodes having a positive data value greater than a first predetermined threshold 906 — Assign a negative touch value to each touch node having a negative data value less than a second predetermined threshold 908 — Determine a total count of the positive and negative touch values 910 — Determine a differ count for each touch node 912 — Calculate a percentage based on a ratio of a sum of the differ count and the total count 914 — Enter a pre-water mode when the percentage exceeds a threshold percentage

FIG. 9

TOUCHSCREEN DEVICE AND METHOD OF OPERATING THE SAME

TECHNICAL FIELD

The present invention relates generally to an electronic device and method of operating the same, and, in particular embodiments, to a touchscreen device and a method of operating a touchscreen device.

BACKGROUND

Touchscreens are commonly used in electronic devices, such as tablets, smartphones, and computers. In recent years, there has been a push away from the more traditional methods, as consumers prefer the convenience of portable devices that can support a more flexible lifestyle. To this end, there has been a rise in smaller, portable, hand-held electronic devices, such as mobile phones, tablets, gaming systems, etc. This has given rise to the popularity of touch screens and touch panel displays with larger screens that remain portable. Not only do they provide the functionality of the traditional electronic devices, but touch screens provide additional features.

In typical capacitive touchscreens, a touch event is generally determined to be triggered by a finger or a palm of the user according to an area size of a press or touch by the user. Touchscreen devices use capacitive touchscreens that work by sensing electrical charge from a touch input or finger touch. Capacitive touch sensing has become one of the means of detecting a user's touch on such devices. Since the human body is a good conductor, when a portion of the human body (e.g., a fingertip) approaches a capacitive touchscreen, a capacitance generated between a transparent electrode of the capacitive touchscreens and the human body can vary due to an electrostatic effect. By measuring a capacitance variation of a sensing line on the capacitive touch panel, a position of a touch point is determined.

However, in some devices, water contact may be registered as a touch by the user. That is, water may be registered as a touch on the touchscreen that controls some functionality of the device and interrupt the intended selection by the user. For example, when a user operates the capacitive touchscreen and water is present on the touch panel, the touchscreen controller cannot distinguish the difference between a touch and water to accurately determine whether the touch event is a meaningful touch.

SUMMARY

In an embodiment, a method of operating a touchscreen device includes: measuring a raw data value at a touch node among a plurality of touch nodes on the touchscreen device; assigning a positive touch value to each touch node having a positive raw data value greater than a first predetermined threshold; assigning a negative touch value to each touch node having a negative raw data value less than a second predetermined threshold; determining a total count of the positive touch values and negative touch values; determining a differ count for each of the touch nodes, the differ count being a number of touch nodes containing the negative touch values surrounding each touch node; calculating a percentage based on a ratio of a sum of the differ count and the total count; and entering a pre-water mode when the percentage exceeds a threshold percentage.

In an embodiment, a method of operating an electronic device includes: detecting touch input on a touchscreen of the electronic device; detecting water on the touchscreen; measuring positive touch values and negative touch values generated by the detected touch input and water; entering a pre-water mode when touch input and water are detected; enabling light filters in the pre-water mode so that water detection is reduced; and transitioning to a water mode from the pre-water mode when the touch input is not detected and a sum of the positive touch values is less than an absolute value of a sum of the negative touch values.

In an embodiment, an electronic device includes: a touchscreen; a touchscreen controller; a non-transitory memory storing a program to be executed by the touchscreen controller, the program comprising instructions to: measure a data value at a touch node among a plurality of touch nodes on the touchscreen; assign a positive touch value to each of the touch nodes having a positive data value greater than a first predetermined threshold; assign a negative touch value to each touch node having a negative data value less than a second predetermined threshold; determine a total count of the positive touch values and negative touch values; determine a differ count for each touch node, the differ count being a number of touch nodes containing the negative touch values surrounding each touch node; calculate a percentage based on a ratio of a sum of the differ count and the total count; and enter a pre-water mode when the percentage exceeds a threshold percentage.

BRIEF DESCRIPTION OF THE DRAWINGS

For a more complete understanding of the present invention, and the advantages thereof, reference is now made to the following descriptions taken in conjunction with the accompanying drawings, in which:

FIG. 9 illustrates a flowchart of a method of operating an electronic device according to an embodiment of the present application.

DETAILED DESCRIPTION OF ILLUSTRATIVE EMBODIMENTS

Embodiments of the present invention can enhance touch sensitivity and accuracy when water is present on the touchscreen. Embodiments of the present invention can identify water contact allowing for timely adjustments to touch sensitivity and improved overall performance in touchscreen devices. Various embodiments of the present application disclose a method to filter touch sensitivity on a touchscreen device.

Capacitive touchscreens operate by detecting changes in electrical charge caused by a touch input or finger touch. When water is present on the screen, it can simulate finger touches, leading to unintended selections, reduced touch accuracy, and disruption of multi-touch features. The presence of water impacts user experience and device functionality. By detecting water on the touchscreen and adjusting the touch sensitivity of the touchscreen so that the accuracy of touches can be improved.

Figure 1A:
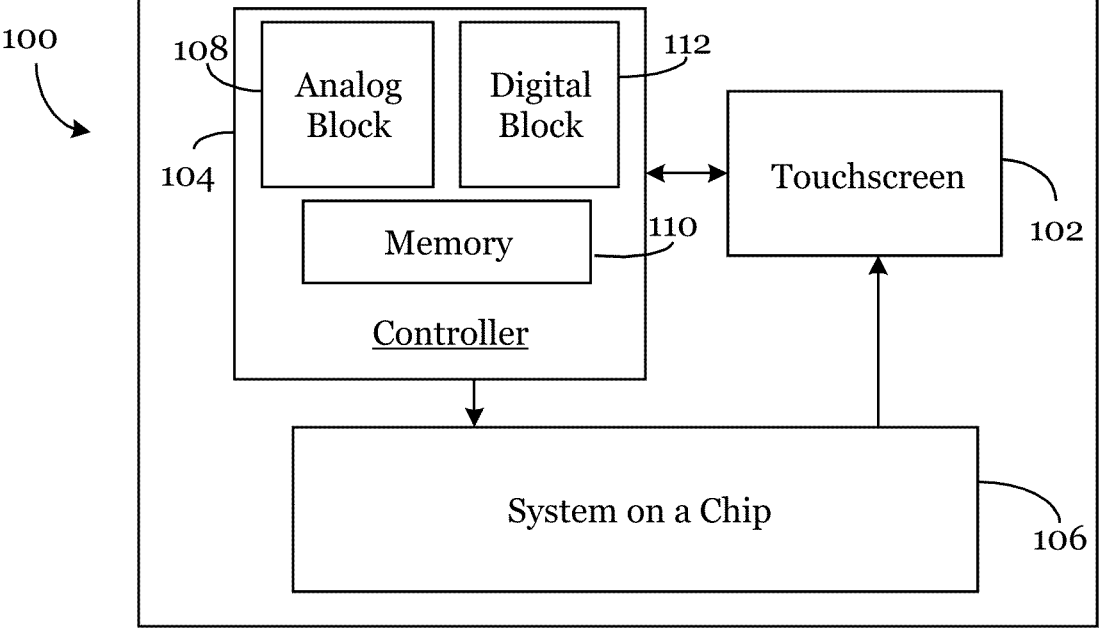
FIG. 1A illustrates a component schematic of an electronic device according to an embodiment of the present application.

FIG. 1A illustrates a component schematic of an electronic device according to an embodiment of the present application.

Referring to FIG. 1A, an electronic device 100 may include a touchscreen 102, a touchscreen controller 104, and a system on a chip 106. The electronic device 100 may be a smart phone, a GPS device, a tablet computer, a mobile media player, a laptop, a gaming system, a personal computer, or any other electronic device that may utilize touch sensitive display.

The touchscreen 102 may be an organic light emitting diode (OLED) display, an LED display, or any other type of display. The touchscreen 102 may include a plurality of pixels in a display layer configured to display an image. As understood by those with ordinary skill in the art, the display layer of the touchscreen 102 may include the plurality of pixels positioned at each of the intersections between the data lines and scan lines. The plurality of scan lines may extend across the rows of the touchscreen 102, and data lines that extend across the columns of the touchscreen 102 in a matrix like formation. The touchscreen 102 may also include a touch sensing layer configured to detect touch inputs made on the touchscreen 102. This will be shown in more detail below.

The touchscreen controller 104 may perform various methods with respect to the display. In various embodiments, the touchscreen controller 104 may be a processor that analyzes information and carries out a series of executable scripts, e.g., stored in a memory 110. In one or more embodiments, the processor may comprise an application-specific integrated circuit (ASIC) device, a central processing unit (CPU), or any other processing unit known in the art. In various embodiments, the touchscreen controller 104 may comprise a number of separate computing units such as cores integrated within one processor, or distinct separate processing chips. Further details regarding how the touchscreen controller 104 accounts for water on the touchscreen 102 are provided below.

In various embodiments, the touchscreen controller 104 may include an analog block 108 and a digital block 112. The analog block 108 may include a plurality of analog circuits configured to measure capacitances across touchscreen 102 and convert them into digital values. The digital block 112 may comprise a variety of digital logic circuits such as DACs or digital control systems configured to obtain digital touch data from the analog block 108, process the digital touch data and store them into memory 110.

The memory 110 may be programmed for short term and/or long term memory storage. The memory 110 may comprise various programs to be executed in the touchscreen controller 104. The memory 110 may include both volatile and non-volatile memories. The memory 110 is designed to retain information generated by the touchscreen controller 104 so it can be recalled at a later time.

In various embodiments, the system on a chip 106, may also be known as an application processor, and may comprise a processor, interface, circuitry, and/or the like configured to direct the flow of input and output data to the touchscreen 102 and the associated touchscreen controller 104. The system on a chip 106 may be configured to receive touch event data from the touchscreen controller 104 and interpret the touch event data based on a user interface or application displayed on the touchscreen 102.

Additionally, the touchscreen controller 104 may be configured to detect touch inputs via a touchscreen 102. In other words, the touchscreen controller 104 may be configured to send touch driving signals (TDS) to the touchscreen, receive touch sensing signals (TSS) in return from the touchscreen, process the TSS to determine coordinates of touch, and report them to the system on a chip 106. Then based on the touch data collected from scanning, the touchscreen may be used by the touchscreen controller 104 to determine the coordinates of touch, and report them to the system on a chip 106. Then, the system on a chip 106 may provide an output to the touchscreen 102 based on the reported coordinates of touch.

Advantageously embodiments of the present application disclose a method for detecting when touch and water are present on the touchscreen device and reduce the sensitivity from the water. In other words, filters can reduce the touch sensitivity on portions of the display where water is present.

Figure 1B:
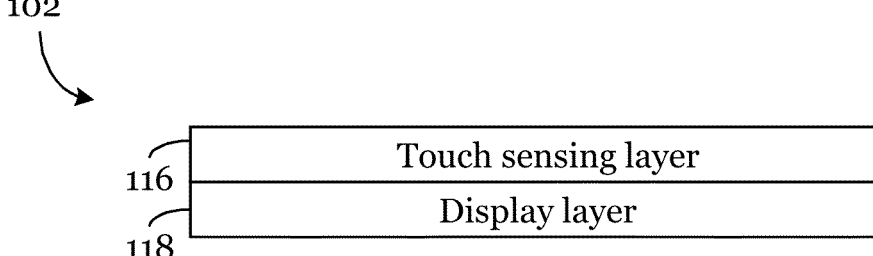
FIG. 1B illustrates a component schematic of a display of the electronic device according to an embodiment of the present application.

FIG. 1B illustrates a schematic of the touchscreen 102. In various embodiments, the touchscreen 102 may include a touch sensing layer 116 and a display layer 118. The touch sensing layer 116 and the display layer 118 may be situated on the front facing side of the electronic device 100. The touch sensing layer 116 is configured to detect touch inputs made on the touchscreen 102.

Figure 1C:
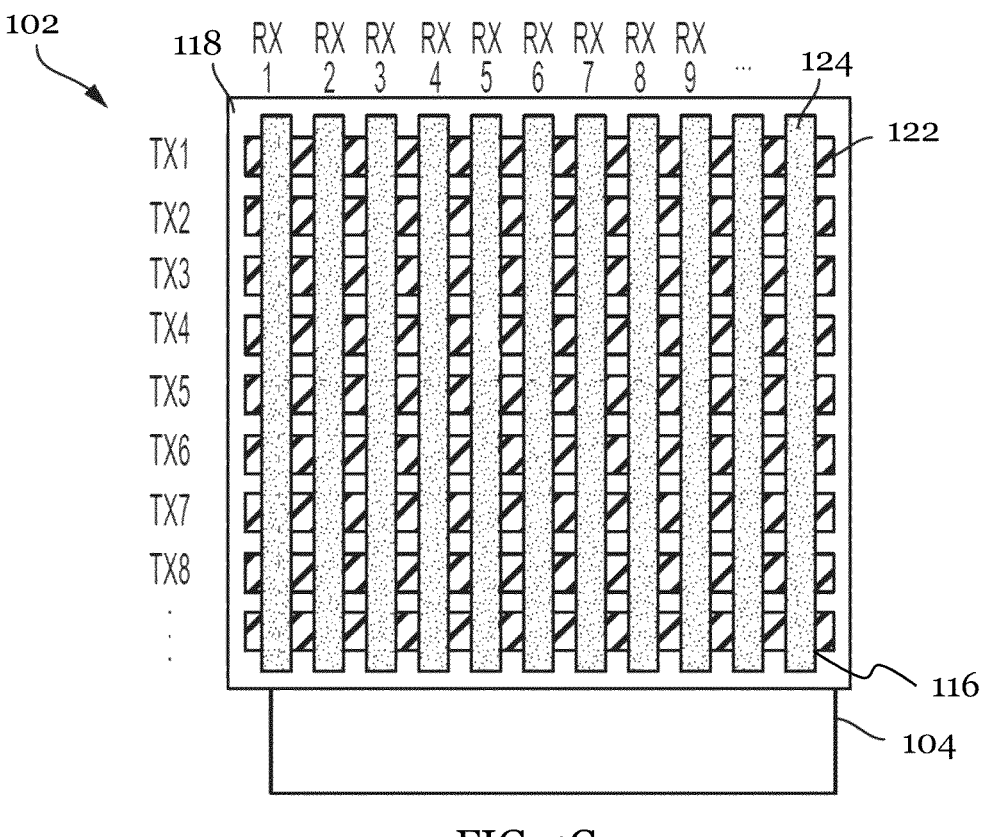
FIG. 1C illustrates a component schematic of a touch sensitive layer of the electronic device according to an embodiment of the present application.

FIG. 1C shows a diagram of touch channels on a touchscreen 102 according to an embodiment of the present application. FIG. 1C will be described in conjunction with the electronic device of FIG. 1A and touchscreen 102 in FIG. 1B.

The touchscreen 102 includes a touch sensing layer 116 and a display layer 118. The touch sensing layer 116 includes a plurality of TX channels 122 and RX channels 124 arranged in rows and columns across the touchscreen 102. The plurality of channels may include transmitting (TX) channels 122 and receiving (RX) channels 124. The TX channels 122 and the RX channels 124 form the touch sensing layer 116. The TX channels 122 may also be referred to as TX electrodes or TX touch sensors. The RX channels 124 may also be referred to as RX electrodes or RX touch sensors.

The TX channels 122 and RX channels 124 may span the entirety of the touchscreen 102 in a grid-like fashion that are operable by a touchscreen controller 104. In various embodiments, the TX channels 122 may be formed in rows across the touchscreen 102 and the RX channels 124 may be formed in columns across the touchscreen 102. In other embodiments, the RX channels 124 may be formed in rows across the touchscreen 102 and the TX channels 122 may be formed in columns across the touchscreen 102. The TX channels 122 and the RX channels 124 may overlap in certain embodiments.

The TX channels 122 and the RX channels 124 may be formed by electrically coupling the touchscreen 102 to rows of capacitive electrodes and columns of capacitive electrodes that span the entirety of the touchscreen 102. In various embodiments, the TX channels 122 and the RX channels 124 have a measurable mutual capacitance at their intersections. In some embodiments, the TX channels 122 and the RX channels 124 may have a self-capacitance that can be measured with respect to ground.

The touchscreen controller 104 is coupled to the TX channels 122 and the RX channels 124 that form the touch sensing layer 116. The TX channels 122 and the RX channels 124 create a matrix of intersections that act as individual touch sensors. The touchscreen controller 104 sends electrical signals through the TX channels and measures the changes in capacitance at each intersection point through the RX channels. The touchscreen controller 104 detects and locates touch events by analyzing the changes in capacitance across the entire grid. The touch events may include a finger touch, stylus or pen touch, water contact, or any contact with that touchscreen 102 that changes the capacitance in the touch sensing layer 116. For convenience, these are all referred to as a finger touch herein. The touchscreen controller 104 can process this raw data, filter out noise, and interpret the touch inputs, translating them into coordinates and gestures that the device's operating system can understand. This integration between the touchscreen controller and the sensor grid enables accurate and responsive touch detection. As discussed below, the touch detection can compensate for water that may be on the touchscreen 102.

Figure 2A:
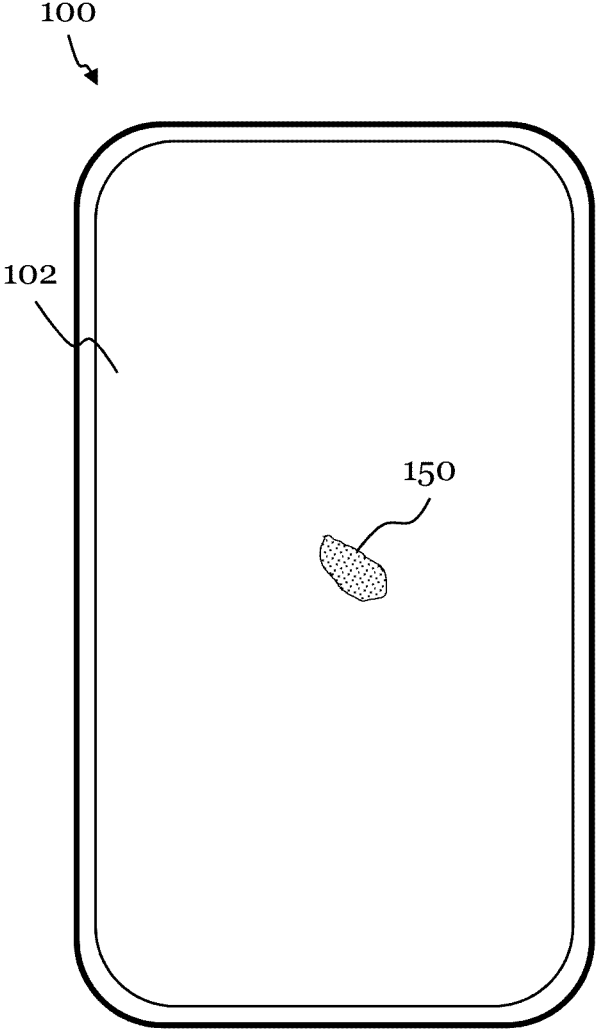
FIGS. 2A-2C illustrate a schematic view of an electronic device according to an embodiment of the present application.
Figure 2B:
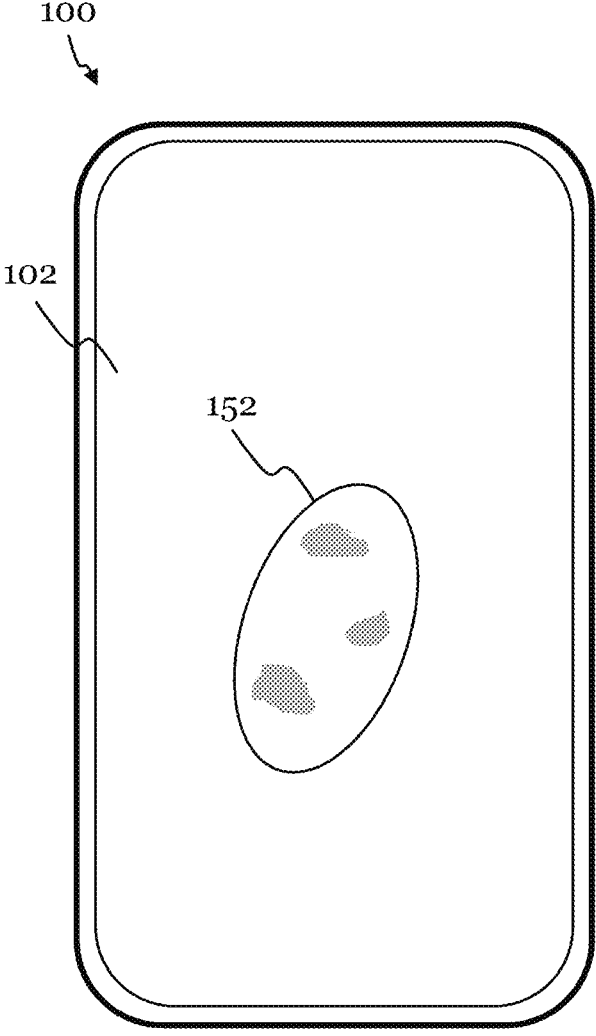
Figure 2C:
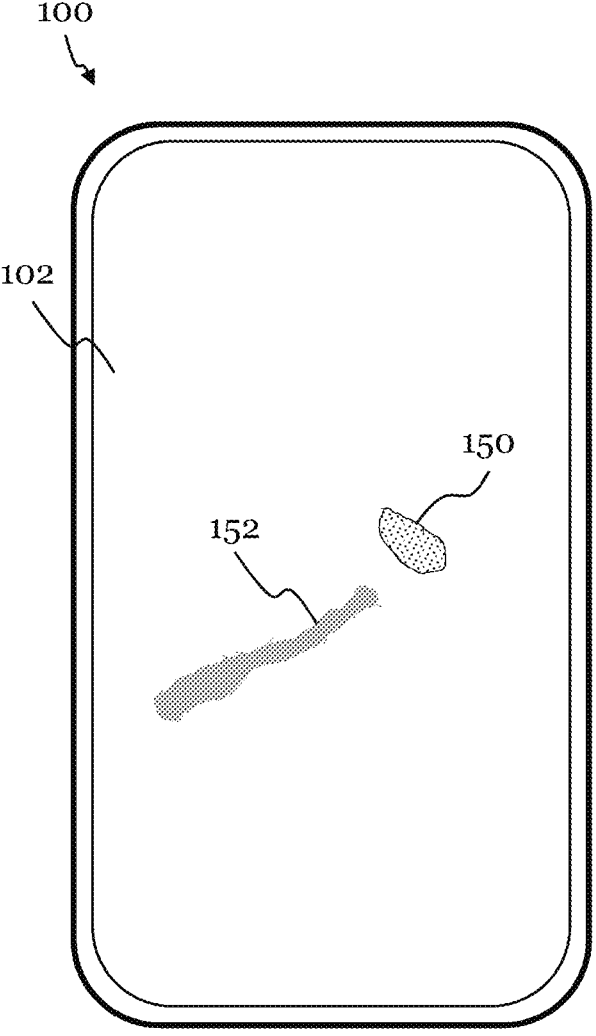

FIGS. 2A-2C illustrate a schematic representation of an electronic device 100 according to an embodiment of the present application. FIGS. 2A-2C will be described in conjunction with FIGS. 1A-1C.

The electronic device 100 includes a touchscreen 102. In one or more embodiments, the touchscreen 102 may be in contact with a finger or water. When a touch input or finger touch 150 is detected on the touchscreen 102, the touchscreen controller 104 detects and locates the touch input or finger touch 150 on the touchscreen 102 based on the changes in capacitance. Similarly, when water contact 152 is detected on the touchscreen 102, the touchscreen controller 104 detects and locates the water on the touchscreen 102 based on the changes in capacitance. Thus, the water contact 152 can simulate a finger touch and lead to unintended selections or reduced touch accuracy.

Referring to FIG. 2A, the touchscreen 102 may receive a touch input from a finger touch or multiple finger touches 150. When a finger touch 150 is in contact with the touchscreen 102, the touchscreen controller 104 detects and locates the touch input from a finger touch or touches 150 by analyzing the changes in capacitance across the entire touch sensing layer 116. When a finger touch or multiple finger touches are in contact with the touchscreen 102, the touchscreen controller 104 operates in normal mode. In normal mode, the touchscreen controller 104 can interpret the finger touches or gestures, and filters out noise or unwanted inputs before being used by the operating system or applications.

Referring to FIG. 2B, the touchscreen 102 may be in contact with a water droplet or multiple water droplets 152. Similar to FIG. 2A, when water 152 is in contact with the touchscreen 102, the touchscreen controller 104 detects and locates the water 152 by analyzing the changes in capacitance across the entire touch sensing layer 116. In this case, the touchscreen controller 104 operates in water mode. In water mode, the touchscreen controller 104 can interpret the water droplets and apply a filter to filter out the water strength or the strength of the change in capacitance caused by the water when a finger touch is not on the touchscreen 102.

Referring to FIG. 2C, the touchscreen 102 may be in contact with a finger touch or touches 150 and a water droplet or droplets 152. When a finger touch 150 and water 152 is in contact with the touchscreen 102, the touchscreen controller 104 detects and locates the finger touch 150 and water 152 by analyzing the changes in capacitance across the entire touch sensing layer 116. When a finger touch 150 and water 152 is in contact with the touchscreen 102, the touchscreen controller 104 enters pre-water mode, e.g., a mode where the device is determining whether it should be operating in normal mode or water mode. In pre-water mode, the touchscreen controller 104 may enable a filter to filter out the water strength without significantly impacting the responsiveness of the touchscreen 102 to the finger touch 150. The filter applied in pre-water mode may be substantially lighter than the filter applied in water mode.

In one embodiment, the electronic device 100 may be designed to operate at a 120 Hz refresh rate. To maintain the specified refresh rate of 120 Hz, for example, the touch detection and processing cycle must be completed within 8.3 ms (1000 ms/120 Hz). The processing time may vary depending on the specific hardware configuration and the number of touch nodes being processed. Without pre-water mode, the processing time for touch detection may be, for example, approximately 6.05 ms. With pre-water mode, the processing time may increase, for example, to approximately 6.75 ms. In this example, the processing time increases by about 700 μs, or 0.7 ms. The total processing time remains well within the 8.3 ms window required for 120 Hz operation. While an addition of a pre-water mode may add to the computational load, the addition has minimal impact on overall performance without compromising on the high-performance standards expected in electronic devices.

Figure 3A:
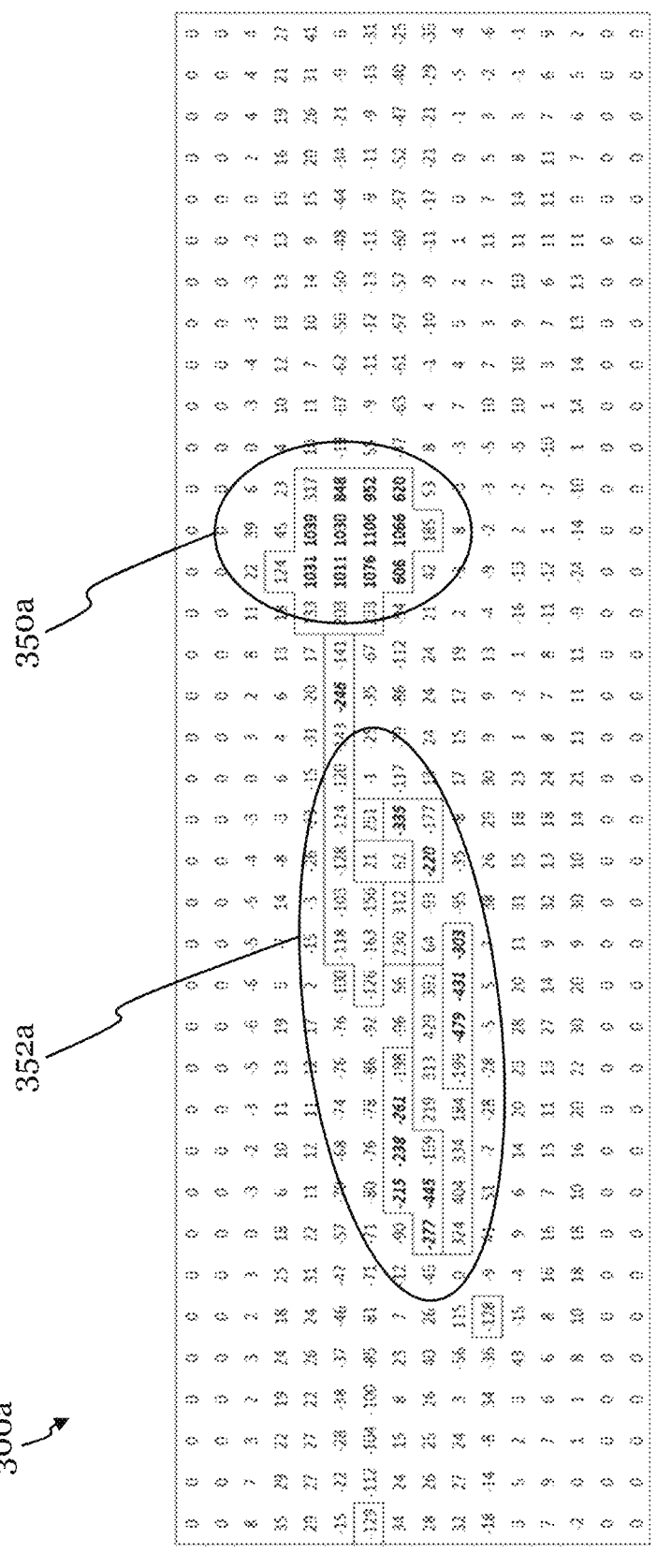
FIGS. 3A-3C illustrate a touch bitmap according to an embodiment of the present application.
Figure 3B:
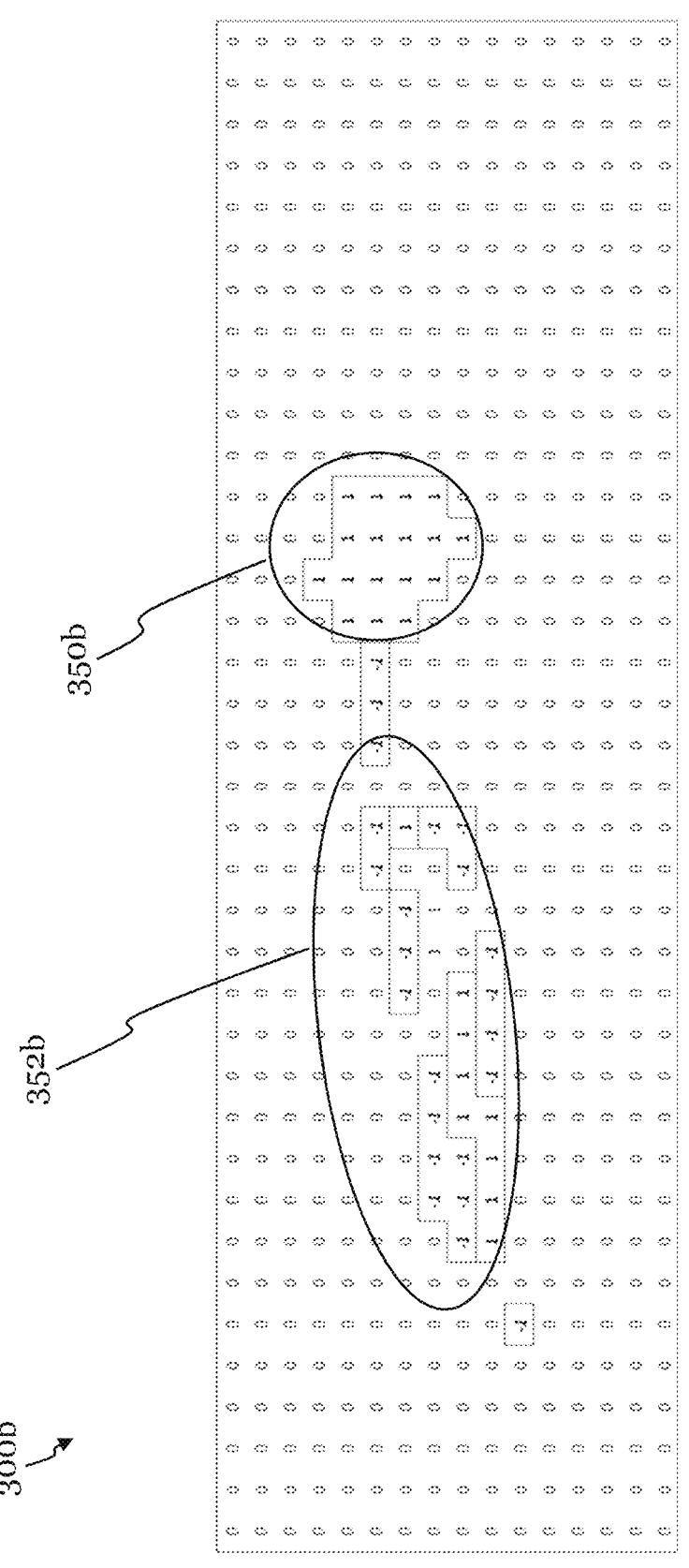
Figure 3C:
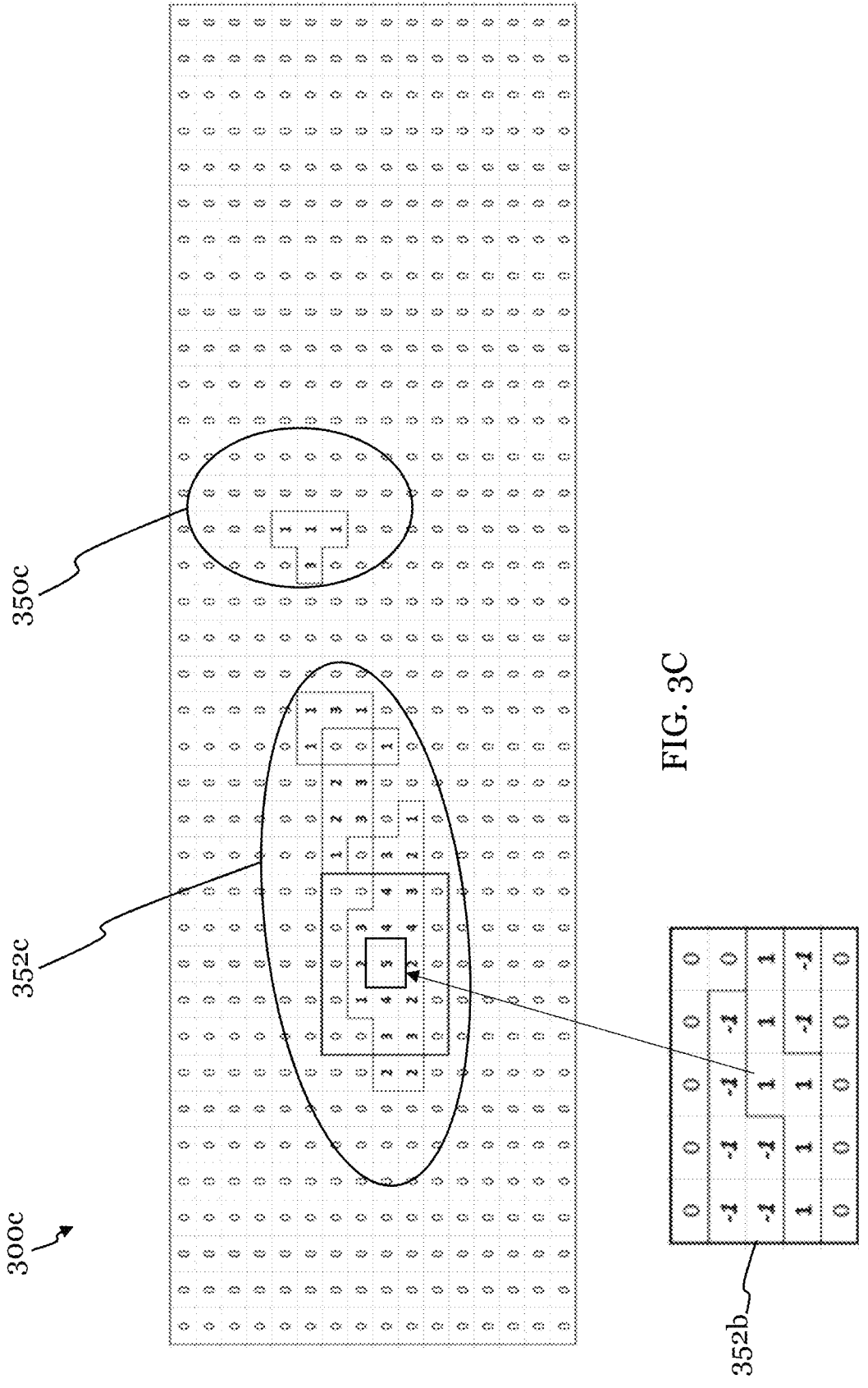

FIGS. 3A-3C illustrate a touch bitmap according to an embodiment of the present application. FIGS. 3A-3C (collectively, FIG. 3) will be described in conjunction with FIGS. 1A-1C and FIGS. 2A-2C. The touch bitmap 300a, 300b, 300c (collectively, 300) shows a location and magnitude of a finger touch data values 350a, 350b, 350c (collectively, 350) and water contact data values 352a, 352b, 352c (collectively, 352).

The touch bitmap 300 is a digital representation of a touchscreen 102. As discussed in FIG. 1C, the touchscreen controller 104 detects and locates touch events by analyzing the changes in capacitance across the entire grid. The touchscreen controller 104 outputs raw data that indicates the changes in capacitance where a touch event is located on the touch bitmap 300. The touch event may correspond to an interactive area on the touchscreen. The interactive area may correspond to a user interface element, for example, a button, slider, or the like. The raw data output comprises a matrix of values that represent capacitance measurements across the touchscreen 102. The touch bitmap 300 may be in the form of a two-dimensional array, where each element corresponds to a specific intersection point of the TX channels 122 and RX channels 124 on the touchscreen 102. Each value in the array represents the measured capacitance or change in capacitance at that particular intersection.

The raw data may include both positive and negative values. Positive values may represent an increase in capacitance which could be caused, for example, by a finger touch or the presence of water. Negative values may represent a decrease in capacitance, which can occur around the edges of a touch event or due to environmental factors. The magnitude of these touch values correlates with the strength of the touch or the amount of interference. Larger positive values indicate a stronger touch or more significant presence of a conductive object (e.g., a finger or water droplet). The raw data also captures information about multiple simultaneous touches, allowing for multi-touch functionality. Each touch point may appear as a cluster of changed values in the data matrix. The touch bitmaps may display the data output in grayscale or in color to represent touch intensity.

Referring to FIG. 3A, the touch bitmap 300*a* shows a first cluster of data values 350*a* at touch nodes corresponding to a finger touch 150 and a second cluster of data values 352*a* of five and a touch node with a negative touch value having three positive touch values surrounding the touch node has a differ count of three.

The differ count and the total count may be used to determine a percentage of transition nodes that indicate water on the touchscreen 102 to enter pre-water mode. The percentage is calculated based on a ratio of a sum of the differ count and the total count where the percentage is equal to $$\frac{\text{sum of the differ count}}{\text{total count of the positive touch values and negative touch values}} * 100.$$

at touch nodes corresponding to water 152 on the touchscreen 102. The first cluster of data values 350*a* include positive values having a relatively large magnitude where the finger touch 150 is in contact with the touchscreen 102. The second cluster of data values 352*a* include positive values of a relatively small magnitude and negative values of a relatively large magnitude where the water 152 is in contact with the touchscreen 102. The touch bitmap 300*a* may be used by the touchscreen controller 104 to determine whether a cluster of data values is caused by the finger touch or the water.

Referring to FIG. 3B, the touch bitmap 300*b* shows the touchscreen controller 104 assigning a positive touch value to each touch node having a positive data value greater than a positive predetermined threshold and a negative touch value to each node having a negative data value less than a negative predetermined threshold. The positive touch value and the negative touch values may be a value of the same magnitude. For example, the positive touch value may be +1 and the negative touch value may be −1. Similarly, the positive predetermined threshold and the negative predetermined threshold may be a value of the same magnitude. In the illustrated example, the positive predetermined threshold may be +120 and the negative predetermined threshold may be −120. The touch nodes having a data value between the positive predetermined threshold and the negative predetermined threshold may be assigned a value of 0. Following the example above, touch nodes having a value between +120 and −120 may be assigned a value of 0. In this example, while the positive predetermined threshold and the negative predetermined threshold have a value of +120 and −120, respectively, the positive predetermined threshold and negative predetermined threshold may vary for different devices or projects that require different touch strengths. For example, the positive and negative predetermined thresholds may be +100 and −100 or +150 and −150 for some projects. In some embodiments, the positive and negative predetermined thresholds may have different magnitudes, for example, +150 and −120 or +120 and −100.

The touchscreen controller 104 determines the total count of the touch nodes with positive touch values and negative touch values. For example, referring to FIG. 3B, the touch bitmap 300*b* has a total count of touch nodes of 51 which includes 28 touch nodes have a positive touch value and 23 touch nodes have a negative touch value.

Referring to FIG. 3C, the touch bitmap 300*c* shows the touchscreen controller 104 determining a differ count for each touch node. The differ count for each touch node is a number of touch nodes containing touch values with an opposite sign surrounding that touch node. For example, a touch node with a positive touch value having five negative touch values surrounding that touch node has a differ count When the percentage exceeds a threshold percentage, the touchscreen controller 104 can enter pre-water mode. The threshold percentage may be, for example, 100%. For example, referring to FIGS. 3B and 3C, the sum of the differ count is 74 and the total count is 51 so the percentage is equal to 145%, therefore, the touchscreen controller 104 enters pre-water mode.

Figure 4:
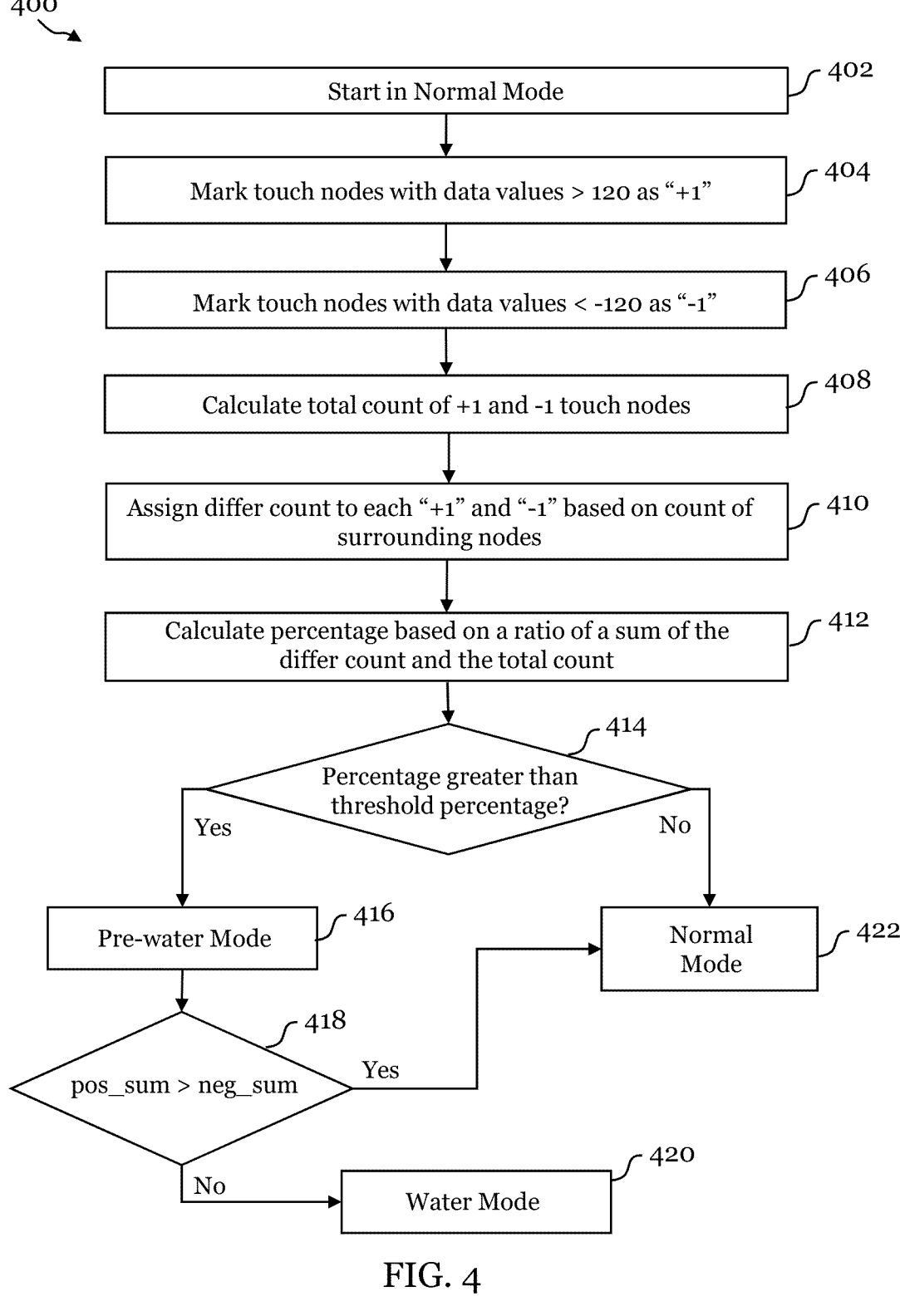
FIG. 4 illustrates a system for operating modes for an electronic device according to an embodiment of the present application.

FIG. 4 shows a flowchart 400 for a method of determining operation modes according to an embodiment of the invention. FIG. 4 will be described in conjunction with FIGS. 1A-1C, 2A-2C, and 3A-3C.

The process begins with step 402, the electronic device 100 starts in normal mode. The flowchart proceeds to step 404 to mark touch nodes having a raw data value greater than 120 with a touch value of +1. For example, referring to FIG. 3A, the raw data values 350*a* and 352*a* of the touch nodes greater than 120 are marked with a touch value of +1 as shown in FIG. 3B. While steps 404 marks touch nodes having a raw data value greater than 120, some embodiments may mark touch nodes having a raw data value greater than 50 or 200, for example.

The flowchart proceeds to step 406 to mark touch nodes having a raw data value less than −120 with a touch value of −1. For example, referring to FIG. 3A, the touch nodes 350*b* having a raw data value less than −120 are marked with a touch value of −1, as shown in FIG. 3B. While steps 406 marks touch nodes having a raw data value less than −120, some embodiments may mark touch nodes having a raw data value less than −50 or −200, for example. In some embodiments, step 406 may occur before step 404. In some embodiments, steps 404 and 406 may occur simultaneously. In some embodiments, touch nodes with raw data values less than 120 and greater than −120 may be marked with a touch value of 0.

In step 408, the total count of the touch nodes marked with +1 and −1 are calculated. In step 410, a differ count is assigned to each touch node marked with +1 and −1. The differ count assigned to each touch node is determined by a count of the marked touch nodes having an opposite sign surrounding that touch node. For example, referring to FIG. 3C, a touch node marked with +1 touch value is assigned a differ count corresponding to the count of the surrounding touch nodes marked with −1 and a touch node marked with −1 touch value is assigned a differ count corresponding to the count of the surrounding touch nodes marked with +1.

In step 412, a percentage based on a ratio of the sum of the differ count and total count is calculated. The ratio being $$\frac{\text{sum of the differ count}}{\text{total count of marked touch values}}.$$

In step 414, when the percentage is greater than a threshold percentage, the flowchart 400 proceeds to enter pre-water mode in step 416. While in pre-water mode, the touchscreen controller 104 checks whether an absolute value of a sum of the positive values (pos_sum) of the raw data is greater than an absolute value of a sum of the negative values (neg_sum) of the raw data (step 418). The pos_sum is calculated based on the touch nodes greater than the positive predetermined threshold and neg_sum is calculated based on the touch nodes less than the negative predetermined threshold. The touch nodes with raw data values between the positive predetermined threshold and the negative predetermined threshold are not included in the pos_sum and neg_sum calculation. When the pos_sum is greater than the neg_sum, the flowchart 400 exits pre-water mode 416 and enters normal mode 422. When the pos_sum is less than the neg_sum, the flowchart 400 exits pre-water mode 416 and enters water mode 420.

FIGS. 5A-5D illustrate exemplary touch bitmaps according to an embodiment of the present application. FIGS. 5A-5D will be described in conjunction with FIGS. 1A-1C and FIG. 4. The touch bitmaps 500a, 500b, 500c, 500d (collectively, 500) show exemplary data values when a finger or multiple fingers are near or in contact with a touchscreen 102 without water present on the touchscreen. The touch bitmap 500 is a digital representation of the touchscreen 102. The touchscreen controller 104 outputs raw data that indicates the changes in capacitance where a touch event is located on the touch bitmap 500.

Figure 5A:
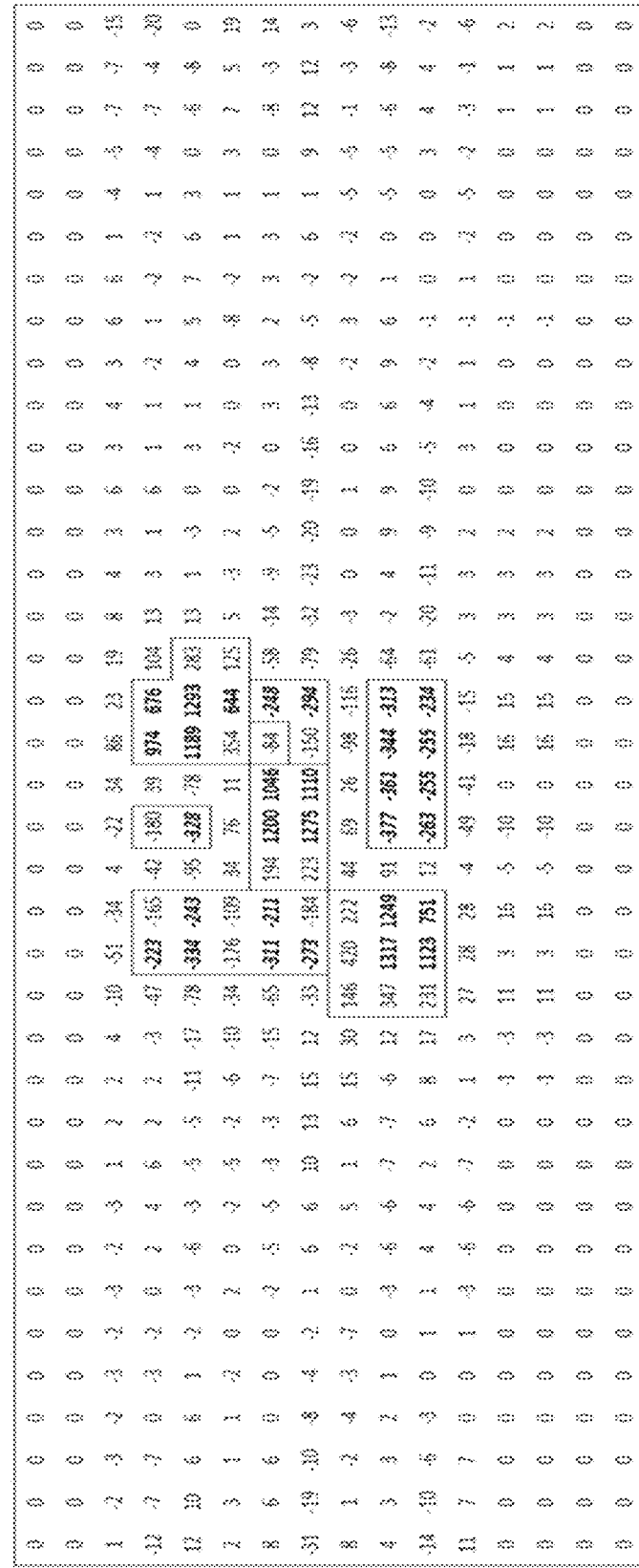
FIGS. 5A-5D illustrate exemplary touch bitmaps according to an embodiment of the present application.
Figure 5B:
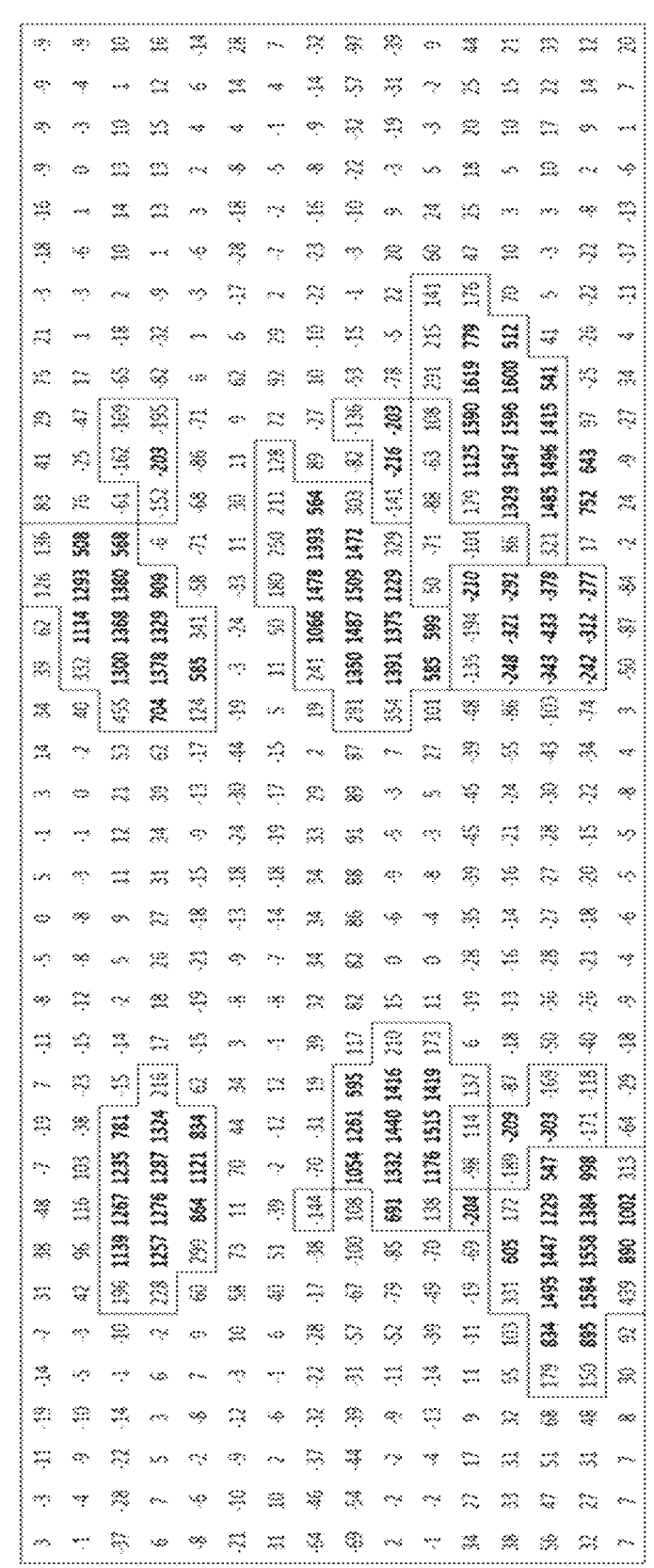
Figure 5C:
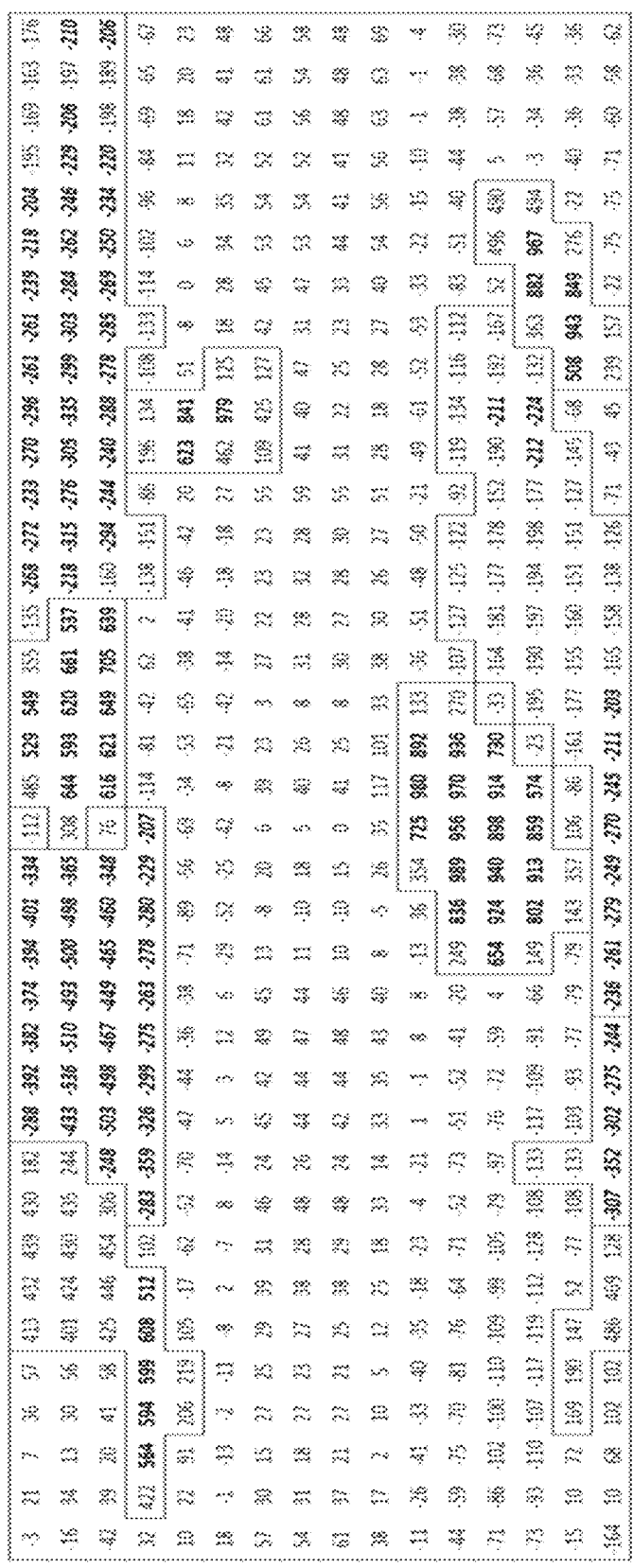
Figure 5D:
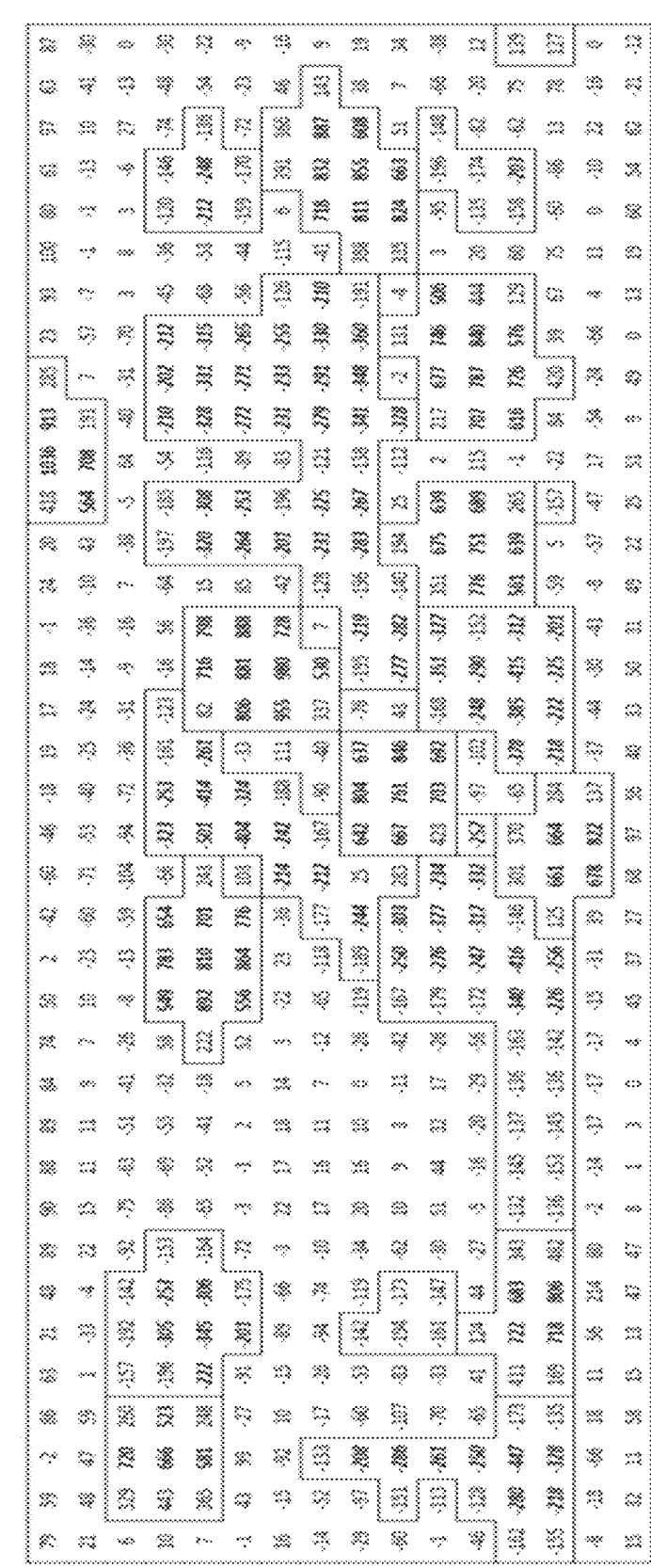

As discussed in FIG. 4, in steps 414 and 422, when the calculated percentage based on a sum of the differ count and the total count is less than the threshold percentage, the system operates in normal mode. Referring to FIG. 5A, the touch bitmap 500a shows exemplary data values where the calculated percentage is 62%. Referring to FIG. 5B, the touch bitmap 500b shows exemplary data values where the calculated percentage is 42%. Referring to FIG. 5C, the touch bitmap 500c shows exemplary data values where the calculated percentage is 43%. Referring to FIG. 5D, the touch bitmap 500d shows exemplary data values where the calculated percentage is 68%. In these examples, the threshold percentage is 100% so the system operates in normal mode as shown in step 422 of FIG. 4.

FIGS. 6A-6D illustrate exemplary touch bitmaps according to an embodiment of the present application. FIGS. 6A-6D will be described in conjunction with FIGS. 1A-1C and FIG. 4. The touch bitmaps 600a, 600b, 600c, 600d (collectively, 600) show exemplary for when a finger or multiple fingers are near or in contact with a touchscreen 102 and water is present on the touchscreen.

Figure 6A:
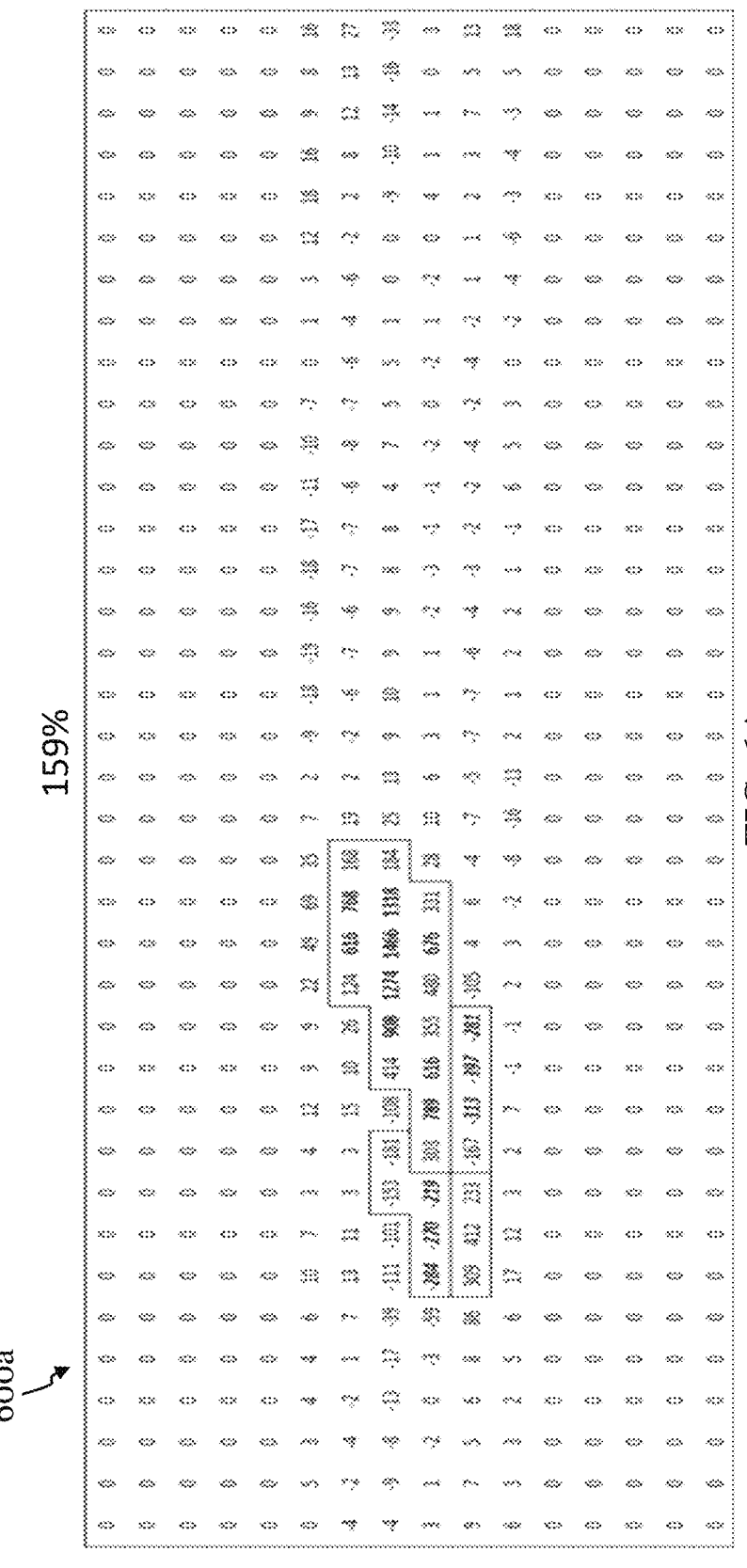
FIGS. 6A-6D illustrate exemplary touch bitmaps according to an embodiment of the present application.
Figure 6B:
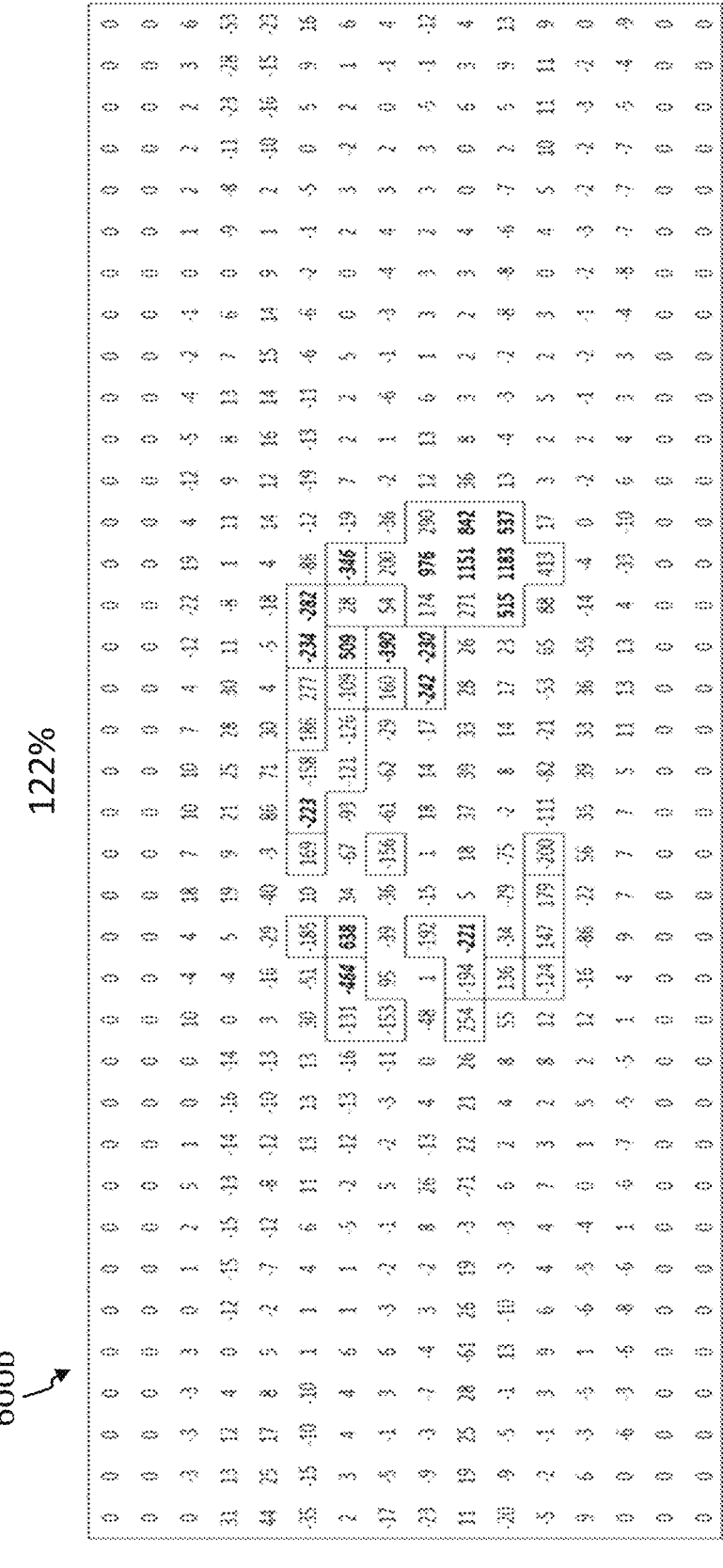
Figure 6C:
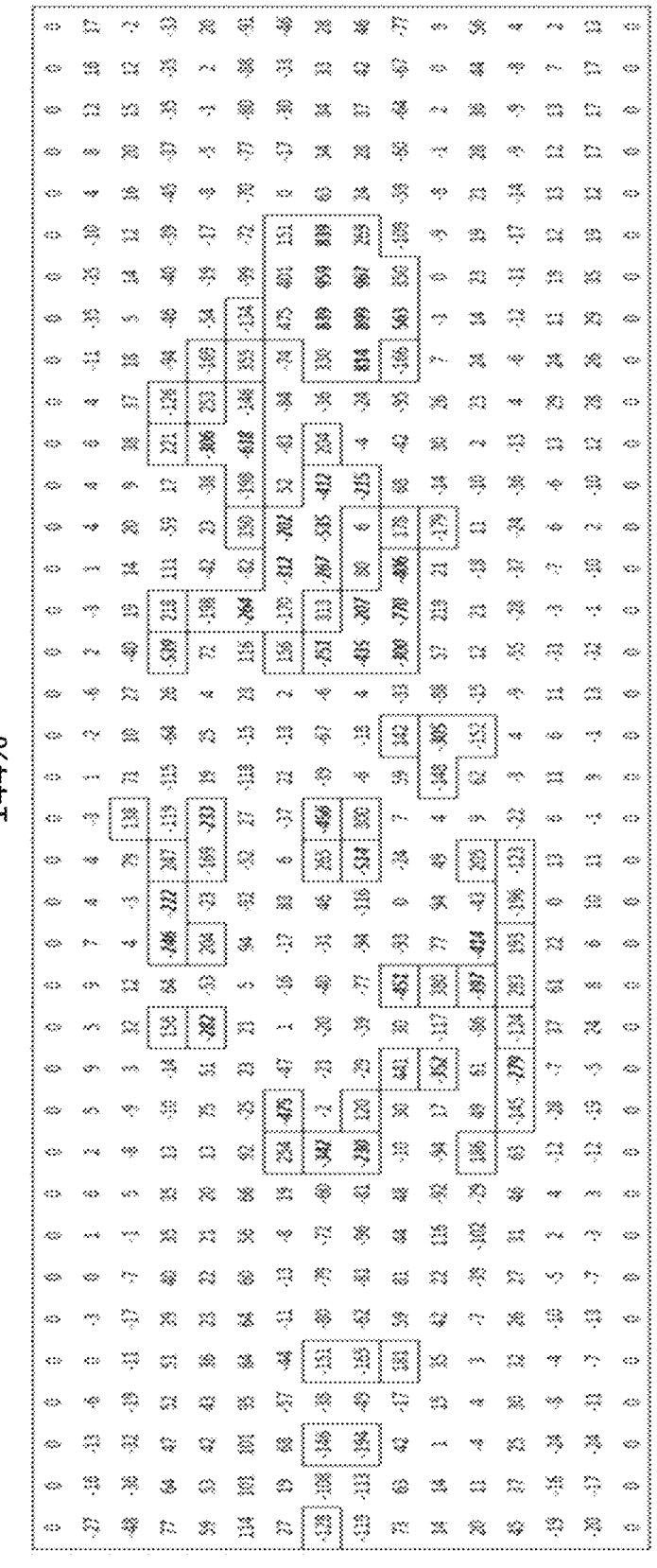
Figure 6D:
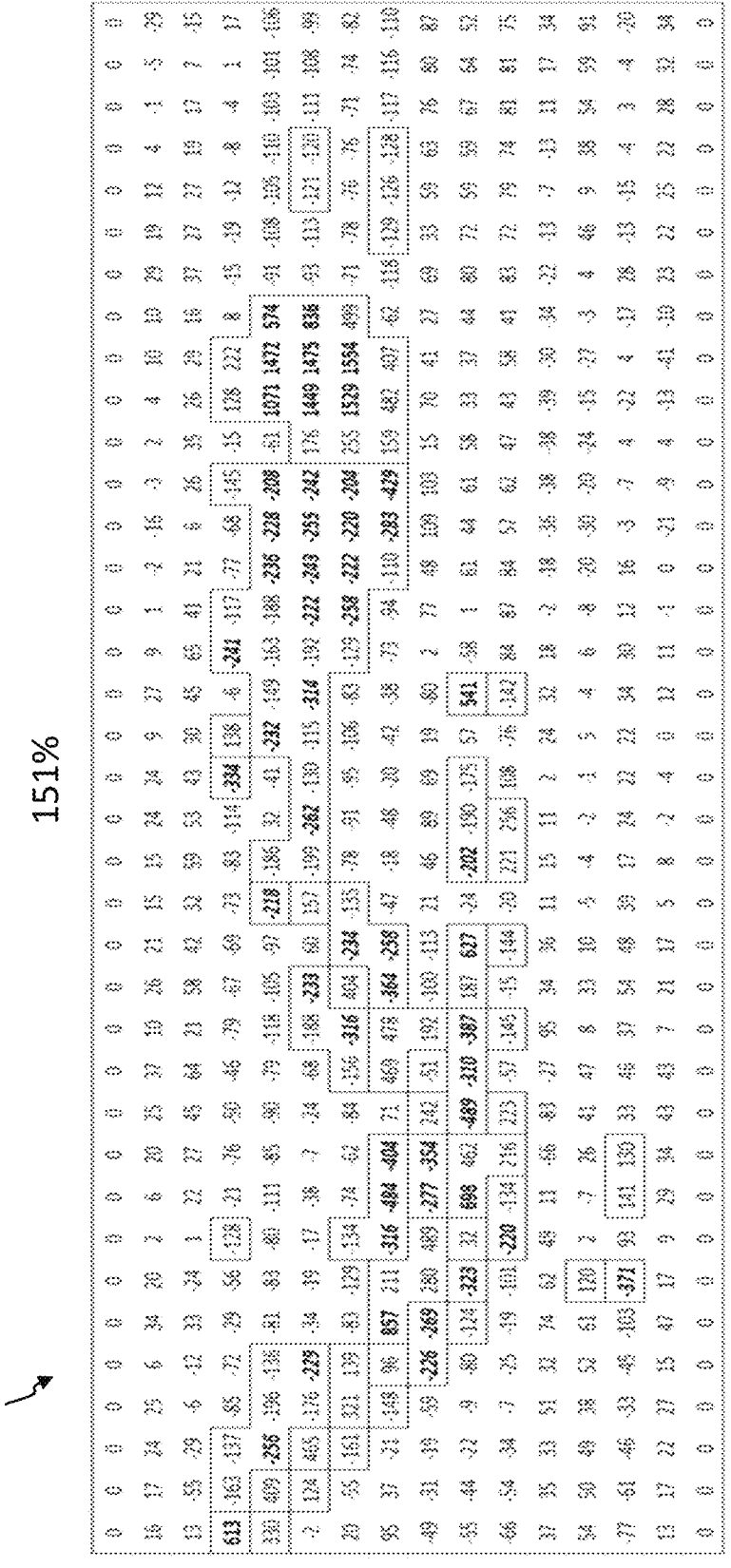

As discussed in FIG. 4, in steps 414 and 416, when the calculated percentage based on a sum of the differ count and the total count is greater than the threshold percentage, the system operates in pre-water mode. Referring to FIG. 6A, the touch bitmap 600a shows exemplary raw data values where the calculated percentage is 159%. Referring to FIG. 6B, the touch bitmap 600b shows exemplary raw data values where the calculated percentage is 122%. Referring to FIG. 6C, the touch bitmap 600c shows exemplary raw data values where the calculated percentage is 144%. Referring to FIG. 6D, the touch bitmap 600d shows exemplary raw data values where the calculated percentage is 151%. In these examples, the threshold percentage is 100% so the system enters pre-water mode as shown in step 416 of FIG. 4.

Figure 7:
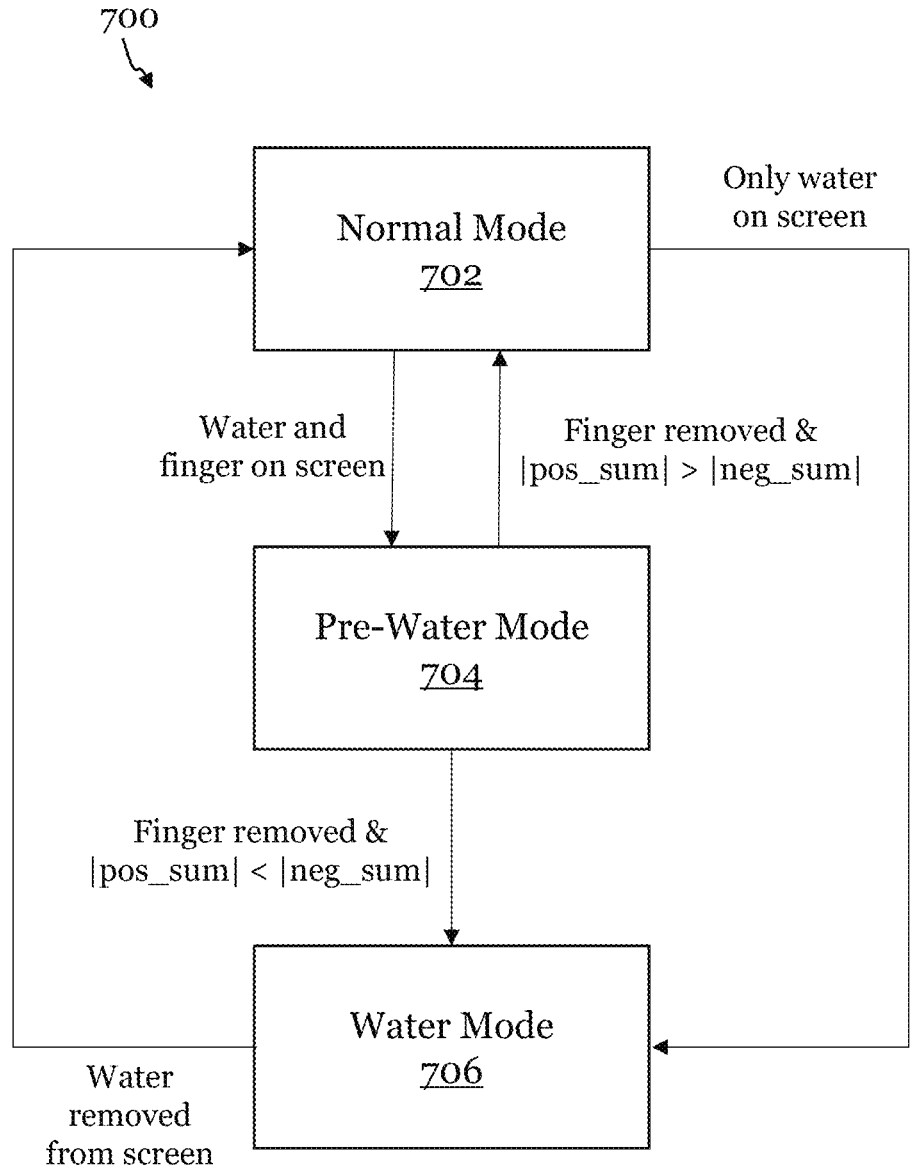
FIG. 7 illustrates a system for operating modes for an electronic device according to an embodiment of the present application.

FIG. 7 shows a system 700 of operating modes for an electronic device 100 according to an embodiment of the present application. FIG. 7 will be described in conjunction with FIGS. 1A-1C, 2A-2C, and 3A-3C. The operating modes includes a normal mode 702, a pre-water mode 704, and a water mode 706.

When a user is using the electronic device 100 and water is not on the touchscreen 102, the touchscreen controller operates in normal mode 702. In normal mode 702, the touchscreen controller 104 determines the location of the finger touches and filters out display noise or unwanted inputs. When a finger and water are in contact with the touchscreen 102 as shown in FIG. 2C, the system 700 changes to pre-water mode 704. When water is present on the touchscreen 102 without a finger touch as shown in FIG. 2B, the system 700 changes to water mode 706.

When a user is using the electronic device 100 and a finger touch 150 and water 152 are in contact with the touchscreen 102, the system 700 exits normal mode 702 and enters pre-water mode 704. In pre-water mode 704, the touchscreen controller 104 determines whether the changes in capacitance is caused by the finger touch or the water. The touchscreen controller 104 may enable light filters to filter out the water strength without significantly impacting the responsiveness of the touchscreen 102 to the finger touch 150.

When the finger touch 150 is removed from the touchscreen 102, the system 700 exits pre-water mode 704 and may move to normal mode 702 or water mode 706 based on an absolute value of a sum of the negative values (neg_sum) of the raw data value and an absolute value of the sum of the positive values (pos_sum) of the raw data value. When the pos_sum is greater than the neg_sum and only water is on the touchscreen 102, the system 700 exits pre-water mode 704 and enters normal mode 702. When the pos_sum is less than the neg_sum and only water is on the touchscreen 102, the system 700 exits pre-water mode 704 and enters water mode 706.

When the system 700 is in water mode 706, the touchscreen controller 104 can interpret the water droplets and apply filters to screen out water-induced signals on the touchscreen 102 before detecting the next finger touch. The system 700 exits water mode 706 when water is removed from the screen and returns to normal mode 702.

Figure 8:
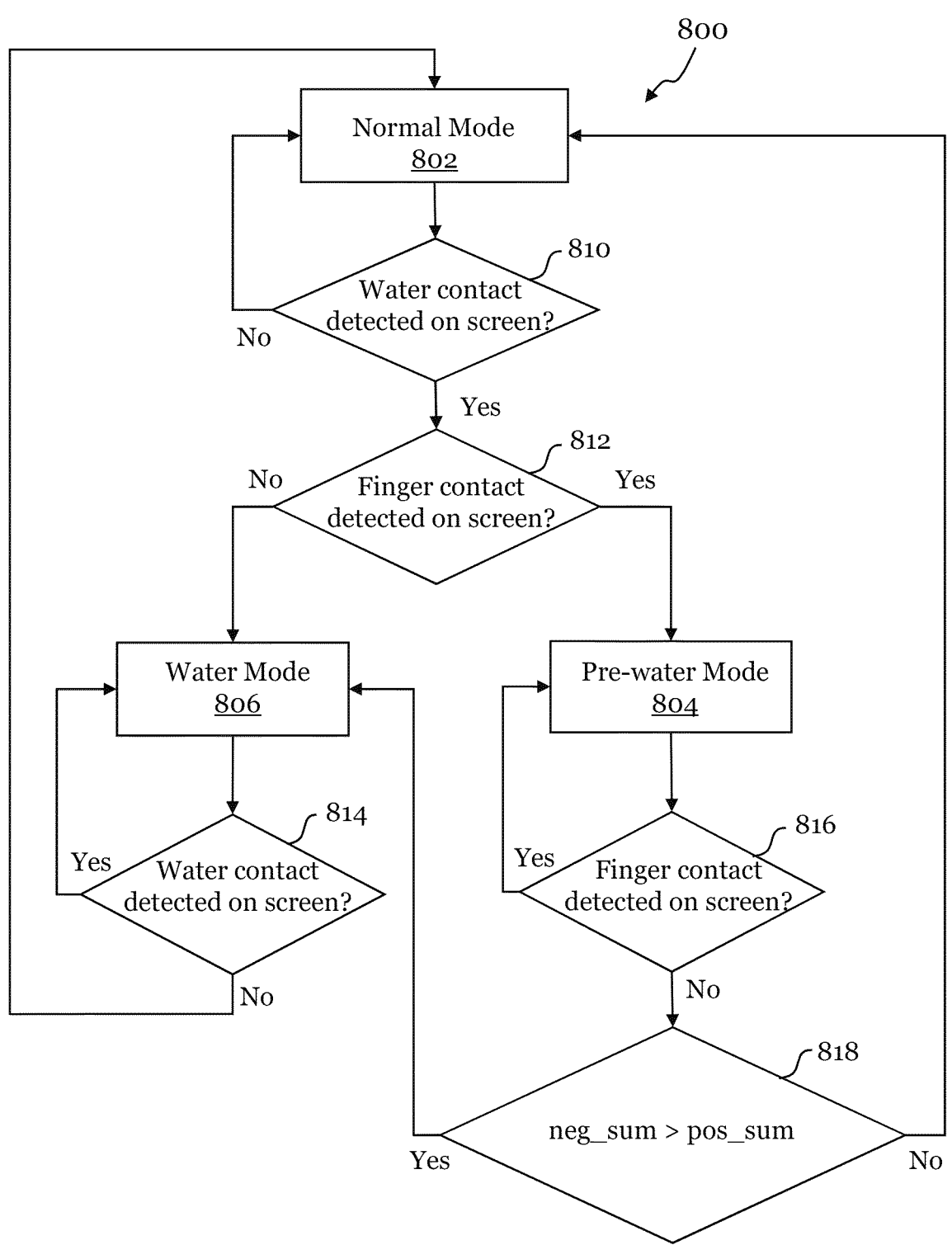
FIG. 8 illustrates a flowchart of a method of operating an electronic device according to an embodiment of the present application.

FIG. 8 presents a flowchart detailing the process for switching between operating modes in an embodiment. The process 800 begins in normal mode 802, the process continuously checks whether water is detected in step 810. When water is detected in step 810, the process flows to step 812 to check whether a finger touch is detected. When a finger is not detected in step 812, the process 800 enters water mode 806. When both water is detected in step 810 and a finger is detected in step 812, the process 800 proceeds to enter pre-water mode 804.

In pre-water mode 804, the process 800 continues to monitor for finger presence in step 816. When a finger is no longer detected in step 816, the flowchart proceeds to step 818 to compare an absolute value of a sum of the negative values (neg_sum) of the raw data value and an absolute value of the sum of the positive values (pos_sum) of the raw data value and return to normal mode 802 or enter water mode 806. The neg_sum is calculated based on the touch nodes less than the negative predetermined threshold and the pos_sum is calculated based on the touch nodes greater than the positive predetermined threshold. The touch nodes with raw data values between the positive predetermined threshold and the negative predetermined threshold are not included in the pos_sum and neg_sum calculation. When the pos_sum is greater than the neg_sum, the flowchart returns to normal mode 802. When the pos_sum is less than the neg_sum, the flowchart proceeds to water mode 806.

In water mode 806, the process 800 continues to check for water presence in step 814, returning to normal mode 802 when water is no longer detected.

FIG. 9 illustrates a flowchart of a method 900 for operating an electronic device according to an embodiment of the present application. The process begins by measuring a raw data value at a touch node among a plurality of touch nodes on the touchscreen device in step 902

In step 904, a positive touch value is assigned to each of the touch nodes having a positive raw data value greater than a first predetermined threshold. The positive raw data values that are greater than the first predetermined threshold may indicate a finger touch on the touchscreen device. The positive touch value assigned to each touch node may be a value of 1.

In step 906, a negative touch value is assigned to each touch node having a negative raw data value less than a second predetermined threshold. The negative raw data values that are less than the second predetermined threshold may indicate water presence on the touchscreen device. The negative touch value assigned to each touch node may be a value of −1.

In step 908, a total count of the positive and negative touch values is determined.

In step 910, a differ count for each touch node is determined. The differ count is a number of touch nodes containing the negative touch values surrounding each touch node.

In step 912, a percentage is calculated based on a ratio of a sum of the differ count and the total count. The percentage based on the ratio of the sum of the differ count and the total count is equal to $$\frac{\text{sum of the differ count}}{\text{total count of the positive touch values and negative touch values}} * 100.$$

In step 914, the electronic device enters a pre-water mode when the percentage exceeds a threshold percentage. In some embodiments, the threshold percentage may be 100%

This approach allows for more accurate detection of water presence on the touchscreen, particularly when a finger is also in contact with the screen. By entering pre-water mode, the device can maintain touch functionality while mitigating the effects of water interference, thereby enhancing user experience in wet conditions.

Example embodiments of the invention are summarized here. Other embodiments can also be understood from the entirety of the specification as well as the claims filed herein.

Example 1. A method of operating a touchscreen device, the method includes: measuring a raw data value at a touch node among a plurality of touch nodes on the touchscreen device, assigning a positive touch value to each touch node having a positive raw data value greater than a first predetermined threshold, assigning a negative touch value to each touch node having a negative raw data value less than a second predetermined threshold, determining a total count of the positive touch values and negative touch values, determining a differ count for each of the touch nodes, the differ count being a number of touch nodes containing the negative touch values surrounding each touch node, calculating a percentage based on a ratio of a sum of the differ count and the total count, and entering a pre-water mode when the percentage exceeds a threshold percentage.

Example 2. The method of example 1, further includes transitioning from the pre-water mode to a water mode when touch input is not detected and a sum of the positive touch values is less than an absolute value of a sum of the negative touch values.

Example 3. The method of example 1 or 2, further includes transitioning from the pre-water mode to a normal mode when touch input is no longer detected and a sum of the positive touch values is greater than an absolute value of a sum of the negative touch values.

Example 4. The method of examples 1 to 3, where assigning the positive touch values to each of the touch nodes includes assigning the touch nodes a value of 1.

Example 5. The method of examples 1 to 4, where assigning the negative touch values to each touch node includes assigning the touch nodes a value of −1.

Example 6. The method of examples 1 to 5, where determining the differ count for each touch node includes calculating a count of the touch nodes having an opposite sign surrounding that touch node.

Example 7. The method of examples 1 to 6, where the percentage based on the ratio of the sum of the differ count and the total count is equal to $$\frac{\text{sum of the differ count}}{\text{total count of the positive touch values and negative touch values}} * 100.$$

Example 8. The method of examples 1 to 7, where the threshold percentage is 100%.

Example 9. A method of operating an electronic device, the method includes: detecting touch input on a touchscreen of the electronic device, detecting water on the touchscreen, measuring positive touch values and negative touch values generated by the detected touch input and water, entering a pre-water mode when touch input and water are detected, enabling light filters in the pre-water mode so that water detection is reduced, and transitioning to a water mode from the pre-water mode when the touch input is not detected and a sum of the positive touch values is less than an absolute value of a sum of the negative touch values.

Example 10. The method of example 9, further includes: detecting the touch input leaving the touchscreen, and transitioning to a normal mode from the pre-water mode in response to detecting the touch input leaving the touchscreen and a sum of the positive touch values is greater than an absolute value of a sum of the negative touch values.

Example 11. The method of example 9 or 10, further includes: detecting the touch input leaving the touchscreen, and transitioning to the water mode from a normal mode in response to detecting water on the touchscreen and detecting the touch input leaving the touchscreen.

Example 12. The method of examples 9 to 11, further includes: detecting a removal of the water on the touchscreen, and transitioning to a normal mode from the water mode in response to detecting the removal of the water from the touchscreen.

Example 13. The method of examples 9 to 12, where the touch input includes a finger touch or pen touch.

Example 14. An electronic device, the device includes: a touchscreen, a touchscreen controller, a non-transitory memory storing a program to be executed by the touchscreen controller, the program includes instructions to: measure a raw data value at a touch node among a plurality of touch nodes on the touchscreen; assign a positive touch value to each of the touch nodes having a positive raw data value greater than a first predetermined threshold, assign a negative touch value to each touch node having a negative raw data value less than a second predetermined threshold, determine a total count of the positive touch values and negative touch values, determine a differ count for each touch node, the differ count being a number of touch nodes containing the negative touch values surrounding each touch node, calculate a percentage based on a ratio of a sum of the differ count and the total count, and enter a pre-water mode when the percentage exceeds a threshold percentage.

Example 15. The device of example 14, where the program further includes instructions to transition from the pre-water mode to a water mode when touch input is not detected and a sum of the positive touch values is less than an absolute value of a sum of the negative touch values.

Example 16. The device of example 14 or 15, where the program further includes instructions to transition from the pre-water mode to a normal mode when touch input is no longer detected and a sum of the positive touch values is greater than an absolute value of a sum of the negative touch values.

Example 17. The device of examples 14 to 16, where assigning the positive touch values to each touch node includes assigning the touch nodes a value of 1.

Example 18. The device of examples 14 to 17, where assigning the negative touch values to each touch node includes assigning the touch nodes a value of −1.

Example 19. The device of examples 14 to 18, where determining the differ count for each touch node includes calculating a count of the touch nodes having an opposite sign surrounding that touch node.

Example 20. The device of examples 14 to 19, where the percentage based on the ratio of the sum of the differ count and the total count is equal to $$\frac{\text{sum of the differ count}}{\text{total count of the positive touch values and negative touch values}} * 100.$$

15

Example 21. The device of examples 14 to 20, where the threshold percentage is greater than 100%.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating a touchscreen device, the method comprising:

measuring a raw data value at a touch node among a plurality of touch nodes corresponding to a current touch bitmap of the touchscreen device;

assigning a positive touch value to each of the touch nodes on the current touch bitmap having a positive raw data value greater than a first predetermined threshold;

assigning a negative touch value to each of the touch nodes on the current touch bitmap having a negative raw data value less than a second predetermined threshold;

determining a total count of touch nodes having the positive touch values and the negative touch values for the current touch bitmap;

determining a differ count for each of the touch nodes for the current touch bitmap, the differ count being based on a number of the touch nodes having the positive touch values or the negative touch values surrounding that touch node, wherein the differ count for each of the touch nodes assigned the positive touch value is a sum of the number of touch nodes having the negative touch values surrounding that touch node and wherein the differ count for each of the touch nodes assigned the negative touch value is a sum of the number of touch nodes having the positive touch values surrounding that touch node;

calculating a percentage based on a ratio of a sum of the differ count and the total count for the current touch bitmap; and entering a pre-water mode in response to the percentage exceeding a threshold percentage.

2. The method of claim 1, further comprising transitioning from the pre-water mode to a water mode when a touch input is not detected and a sum of the positive raw data values is less than an absolute value of a sum of the negative raw data values.

3. The method of claim 1, further comprising transitioning from the pre-water mode to a normal mode when a touch input is not detected and a sum of the positive raw data values is greater than an absolute value of a sum of the negative raw data values.

4. The method of claim 1, wherein assigning the positive touch value to each of the touch nodes comprises assigning each of the touch nodes a value of 1.

5. The method of claim 4, wherein assigning the negative touch value to each of the touch nodes comprises assigning each of the touch nodes a value of $-1$.

6. The method of claim 5, wherein the percentage based on the ratio of the sum of the differ count and the total count is equal to $$\frac{\text{sum of the differ count}}{\text{total count of the positive touch values and negative touch values}} * 100.$$

7. The method of claim 1, wherein the threshold percentage is 100%.

8. The method of claim 1, further comprising:

determining that a touch input and water are on the touchscreen in response to the percentage exceeding the threshold percentage; and detecting a removal of the water on the touchscreen in response to the percentage not exceeding the threshold percentage.

9. A method of operating an electronic device, the method comprising:

detecting touch input on a touchscreen of the electronic device;

detecting water on the touchscreen;

measuring positive touch values and negative touch values across a plurality of touch nodes corresponding to a current touch bitmap, the positive touch values and the negative touch values being generated by the detected touch input and water;

determining a differ count for each of the plurality of touch nodes for the current touch bitmap, wherein the differ count for each of the touch nodes assigned the positive touch value is a sum of a number of touch nodes having the negative touch values surrounding that touch node and wherein the differ count for each of the touch nodes assigned the negative touch value is a sum of a number of touch nodes having the positive touch values surrounding that touch node;

calculating a percentage based on a ratio of a sum of the differ count and a total count of non-zero touch nodes for the current touch bitmap;

determining that the touch input and the water are on the touchscreen in response to the percentage exceeding a threshold percentage;

entering a pre-water mode in response to determining that the touch input and the water are on the touchscreen;

enabling a first filter in the pre-water mode so that water detection is reduced;

transitioning to a water mode from the pre-water mode when the touch input is no longer detected and a sum of the positive touch values on the current touch bitmap is less than an absolute value of a sum of the negative touch values on the current touch bitmap; and enabling a second filter in the water mode so that water detection is further reduced, the second filter being a heavier filter than the first filter.

10. The method of claim 9, further comprising:

detecting the touch input leaving the touchscreen; and transitioning to a normal mode from the pre-water mode in response to detecting the touch input leaving the touchscreen and a sum of the positive touch values is greater than an absolute value of a sum of the negative touch values.

11. The method of claim 9, further comprising:

detecting the touch input leaving the touchscreen; and transitioning to the water mode from a normal mode in response to detecting water on the touchscreen and detecting the touch input leaving the touchscreen.

12. The method of claim 9, further comprising:

detecting a removal of the water on the touchscreen in response to the percentage being less than or equal to the threshold percentage; and transitioning to a normal mode from the water mode in response to detecting the removal of the water from the touchscreen.

13. The method of claim 9, wherein the touch input comprises a finger touch or pen touch.

14. An electronic device, the device comprising:

a touchscreen;

a touchscreen controller;

a non-transitory memory storing a program to be executed by the touchscreen controller, the program comprising instructions to:

measure a raw data value at a touch node among a plurality of touch nodes corresponding to a current touch bitmap of the touchscreen;

assign a positive touch value to each of the touch nodes on the current touch bitmap having a positive raw data value greater than a first predetermined threshold;

assign a negative touch value to each of the touch nodes on the current touch bitmap having a negative raw data value less than a second predetermined threshold;

determine a total count of the positive touch values and the negative touch values for the current touch bitmap;

determine a differ count for each of the touch nodes for the current touch bitmap, the differ count being based on a number of the touch nodes having the positive touch values or the negative touch values surrounding that touch node, wherein the differ count for each of the touch nodes assigned the positive touch value is a sum of the number of touch nodes having the negative touch values surrounding that touch node and wherein the differ count for each of the touch nodes assigned the negative touch value is a sum of the number of touch nodes having the positive touch values surrounding that touch node;

calculate a percentage based on a ratio of a sum of the differ count and the total count for the current touch bitmap; and enter a pre-water mode when the percentage exceeds a threshold percentage.

15. The device of claim 14, wherein the program further comprises instructions to transition from the pre-water mode to a water mode when a touch input is not detected and a sum of the positive raw data values is less than an absolute value of a sum of the negative raw data values.

16. The device of claim 14, wherein the program further comprises instructions to transition from the pre-water mode to a normal mode when a touch input is not detected and a sum of the positive raw data values is greater than an absolute value of a sum of the negative raw data values.

17. The device of claim 14, wherein assigning the positive touch value to each of the touch nodes comprises assigning each of the touch nodes a value of 1.

18. The device of claim 17, wherein assigning the negative touch value to each of the touch nodes comprises assigning each of the touch nodes a value of −1.

19. The device of claim 18, wherein the percentage based on the ratio of the sum of the differ count and the total count is equal to $$\frac{\text{sum of the differ count}}{\text{total count of the positive touch values and negative touch values}} * 100.$$

20. The device of claim 14, wherein the threshold percentage is greater than or equal to 100%.

21. The device of claim 14, wherein the program further comprises instructions to:

determine that a touch input and water are on the touchscreen in response to the percentage exceeding the threshold percentage; and detect a removal of the water on the touchscreen in response to the percentage not exceeding the threshold percentage.

\* \* \* \* \*